US010788428B2

(12) United States Patent
Troy et al.

(10) Patent No.: US 10,788,428 B2
(45) Date of Patent: Sep. 29, 2020

(54) POSITIONING SYSTEM FOR AERIAL NON-DESTRUCTIVE INSPECTION

(71) Applicant: The Boeing Company, Chicago, IL (US)

(72) Inventors: James J. Troy, Issaquah, WA (US); Gary E. Georgeson, Tacoma, WA (US); Scott W. Lea, Renton, WA (US)

(73) Assignee: The Boeing Company, Chicago, IL (US)

( * ) Notice: Subject to any disclaimer, the term of this patent is extended or adjusted under 35 U.S.C. 154(b) by 230 days.

(21) Appl. No.: 15/714,662

(22) Filed: Sep. 25, 2017

(65) Prior Publication Data
US 2019/0094149 A1 Mar. 28, 2019

(51) Int. Cl.
G01N 21/88 (2006.01)
G01S 17/10 (2020.01)
(Continued)

(52) U.S. Cl.
CPC ............ *G01N 21/88* (2013.01); *B64C 39/024* (2013.01); *B64D 47/08* (2013.01); *G01C 11/02* (2013.01);
(Continued)

(58) Field of Classification Search
CPC .................. G01N 21/88; B64C 39/024; B64C 2201/024; B64C 2201/123;
(Continued)

(56) References Cited

U.S. PATENT DOCUMENTS 4,413,905 A 11/1983 Holzapfel
7,813,888 B2 10/2010 Vian et al.
(Continued)

FOREIGN PATENT DOCUMENTS

DE 102013000410 A1 7/2014
KR 20170084966 A 7/2017
(Continued)

OTHER PUBLICATIONS

Partial European Search Report dated Dec. 18, 2018 in European Patent Application No. 18175541.4 (European counterpart of the instant patent application).
(Continued)

Primary Examiner — Maria E Vazquez Colon
(74) Attorney, Agent, or Firm — Ostrager Chong Flaherty & Broitman PC

(57) ABSTRACT

Systems and methods for measuring the distance to a target object and acquiring scale and point-to-point distance information for that target object in an environment using a remotely operated flying platform, such as an unmanned aerial vehicle (UAV). The system uses on-board sensors and processing techniques to provide discrete or continuous measurements of the distances between points on a target object or the scale of the target object. The addition of on-board three-dimensional measurement capabilities to UAVs (or other flying platforms) allows the collection of distance data. Having this capability enables these systems to acquire distances between points on a single object, such as determining the true scale factors of items in images captured by the UAV, in the course of performing metrology-related tasks.

20 Claims, 19 Drawing Sheets

(51) Int. Cl.
  *B64C 39/02* (2006.01)
  *B64D 47/08* (2006.01)
  *G05D 1/10* (2006.01)
  *G06K 9/00* (2006.01)
  *G05D 1/00* (2006.01)
  *G01M 5/00* (2006.01)
  *G01S 17/933* (2020.01)
  *G01C 11/02* (2006.01)
  *G01S 17/87* (2020.01)

(52) U.S. Cl.
  CPC ........ *G01M 5/0008* (2013.01); *G01M 5/0033* (2013.01); *G01M 5/0075* (2013.01); *G01S 17/10* (2013.01); *G01S 17/87* (2013.01); *G01S 17/933* (2013.01); *G05D 1/0038* (2013.01); *G05D 1/102* (2013.01); *G06K 9/00637* (2013.01); *B64C 2201/024* (2013.01); *B64C 2201/123* (2013.01); *B64C 2201/146* (2013.01)

(58) Field of Classification Search
  CPC ... B64C 2201/146; B64D 47/08; G01C 11/02; G01M 5/0008; G01M 5/0033; G01M 5/0075; G01S 17/10; G01S 17/87; G01S 17/933; G05D 1/0038; G05D 1/102; G06K 9/00637
  See application file for complete search history.

(56) References Cited

U.S. PATENT DOCUMENTS

| | | | |
|---|---|---|---|
| 7,859,655 | B2 | 12/2010 | Troy et al. |
| 8,214,098 | B2 | 7/2012 | Murray et al. |
| 8,744,133 | B1 | 6/2014 | Troy et al. |
| 9,221,506 | B1 | 12/2015 | Georgeson et al. |
| 9,371,133 | B2 | 6/2016 | Mays |
| 9,513,635 | B1 | 12/2016 | Bethke et al. |
| 9,804,577 | B1* | 10/2017 | Troy .................. G05B 15/02 |
| 2008/0141129 | A1* | 6/2008 | Oozawa ............. G01C 21/3605 715/702 |
| 2009/0086199 | A1* | 4/2009 | Troy ....................... G01S 7/497 356/251 |
| 2010/0097460 | A1 | 4/2010 | Abernathy |
| 2012/0262708 | A1 | 10/2012 | Connolly |
| 2013/0092852 | A1 | 4/2013 | Baumatz |
| 2014/0376768 | A1* | 12/2014 | Troy .................... G06K 9/3241 382/103 |
| 2015/0043769 | A1* | 2/2015 | Newman .................. H04N 5/33 382/100 |
| 2015/0116481 | A1* | 4/2015 | Troy ........................ B64F 5/60 348/128 |
| 2015/0324643 | A1* | 11/2015 | Lambert ................ G01N 21/88 348/38 |
| 2017/0138740 | A1* | 5/2017 | Almalki .................. G06T 7/292 |
| 2017/0192418 | A1* | 7/2017 | Bethke ................. G08G 5/0013 |
| 2018/0002010 | A1* | 1/2018 | Bauer ................... B64C 39/024 |
| 2018/0149138 | A1* | 5/2018 | Thiercelin .............. B64D 47/08 |
| 2018/0273173 | A1* | 9/2018 | Moura ................... G01N 25/72 |
| 2019/0035144 | A1* | 1/2019 | Evers-Senne .......... G01B 11/24 |
| 2019/0049962 | A1* | 2/2019 | Ouellette ................ G01S 17/86 |

FOREIGN PATENT DOCUMENTS

| | | | |
|---|---|---|---|
| WO | 2017050893 A1 | 3/2017 | |
| WO | WO-2017050893 A1 * | 3/2017 | ............. G01N 25/72 |
| WO | 2017065102 A1 | 4/2017 | |

OTHER PUBLICATIONS

Nikolic et al., "A UAV System for Inspection of Industrial Facilities," Aerospace Conference, 2013 IEEE, Mar. 2-9, 2013.

Extended European Search Report dated Jul. 4, 2019 in European Patent Application No. 18175541.4 (European counterpart of the instant patent application).

Examination Report dated May 25, 2020 in GCC Patent Application No. GC 2018-36059.

* cited by examiner

POSITIONING SYSTEM FOR AERIAL NON-DESTRUCTIVE INSPECTION

BACKGROUND

This disclosure generally relates to systems and methods for performing inspection activities, and more particularly to systems and methods for enabling remote inspection of structures or objects by an unmanned aerial vehicle.

In-person human-based inspections of structures and various types of objects can be time consuming, expensive and difficult for an individual to perform. Examples of structures that pose significant inspection challenges include bridges, dams, levees, power plants, power lines or electrical power grids, water treatment facilities; oil refineries, chemical processing plants, high-rise buildings, infrastructure associated with electric trains and monorail support structures, and aircraft structures at airports.

Utilizing an unmanned aerial vehicle (UAV), an operator can safely acquire images or other sensor data from structures. The UAV operator can initiate an automatic scanning process of structures without being placed in harm's way and without requiring cumbersome and expensive equipment, such as cranes or platforms. A typical unmanned aerial vehicle, however, does not have the ability to acquire accurate data representing the distances between points on an object that might be encountered during flight or the relative scale of objects seen by the on-board camera. For example, while GPS-equipped UAVs can provide a rough estimate of location sufficient for visual inspection, GPS tracking is not accurate enough for use in other non-destructive inspection methods.

The primary method of situational awareness currently available for users of remotely operated mobile platforms such as UAVs is watching a display monitor showing the video from the on-board camera. One of the usability concerns with that approach is that the operator does not have a frame of reference to determine the size of the objects displayed on the screen, which limits the usefulness of inspection applications with these platforms. Another approach to getting scale information is to use an image processing application to identify objects in the scene, but that only works if you have information about objects in the scene and the software is capable of properly identifying them. A further approach is to use depth cameras to measure the distance to the target object, but depth cameras can saturate in bright light and have limited range. Yet another approach is to use a spinning laser scanner on-board the mobile platform to provide a point cloud with distance data, but this methodology acquires more data and is more complex than is needed for measuring the distance to the target object.

Accordingly, it would be desirable to provide the ability to determine distances between points on or sizes of objects appearing in captured images during UAV-based non-destructive inspection.

SUMMARY

The subject matter disclosed in some detail below is directed to systems and methods for acquiring scale and point-to-point distance information for objects undergoing non-destructive inspection using a remotely operated flying platform, such as a UAV. The system uses on-board sensors and processing techniques to provide discrete or continuous measurements of the distances between points on a target object or the scale of the target object. The addition of on-board three-dimensional (3-D) measurement capabilities to UAVs (or other flying platforms) allows the collection of objective distance data that is currently missing from these systems. Having this capability enables these systems to acquire distances between objects in the environment or distances between points on a single object, such as determining the true scale factors of items in images captured by the UAV, in the course of performing metrology-related tasks, which results in a significant increase in the usefulness of some types of flying platforms for inspection applications.

In accordance with some embodiments of a system for aerial non-destructive inspection, the distance separating a camera-equipped UAV and the structure to be inspected is repeatedly measured by on-board equipment as the UAV flies toward the structure and when the separation distance equals a goal offset, the UAV stops flying toward the structure. Optionally, the UAV then orients itself so that the focal axis of the camera is normal to the surface of the structure being imaged and the camera is activated to capture an image for later display. In accordance with one embodiment, the distance information is used to generate a scale indicator which is overlaid on the displayed image. In accordance with another embodiment, the distance information is used to measure the distance between two points on the surface of the structure being imaged, which point-to-point distance value is overlaid on the displayed image.

The concepts described herein provide measurement and control capabilities for UAVs and other remotely operated mobile platforms. The acquisition of measurement data will be divided into the following three categories.

In one category of embodiments, two or more laser pointers and a digital video camera are used to acquire the information to compute: distance to the target, a reference scale for the view of the target, and in some embodiments, distance between points of interest on the target. This category of embodiments is applicable to situations where the target surface is relatively flat and perpendicular to the aim direction of the laser pointers and camera. As used herein, the term "laser pointer" means a device that emits a laser beam and does not detect returned laser light.

Another category of embodiments of the concept are configurations where UAV contains two or more laser range meters that enables: direct measurement of distance to the target, reference scale, as well as one or more orientation angle of the UAV relative to the target. If three non-collinearly mounted laser range meters are used (not shown here), more than one orientation angle can be measured (for example yaw and pitch). As used herein, the term "laser range meter" (also known as "laser rangefinder") means a device that emits a laser beam and detects returned laser light.

A third category of embodiments includes a gimbaled laser range meter is used to acquire distance and aim direction information from the moving platform (e.g., UAV) to objects in the environment. This concept leverages some aspects of the vector-based measurement algorithms disclosed in U.S. Pat. No. 7,859,655 (the disclosure of which is incorporated by reference herein in its entirety), along with the addition of sensors, such as an inertial measurement unit, to determine the relative motion of the platform. This platform motion data along with the aim direction and distance data from the gimbaled laser range meter can be used to acquire measurements of objects in the environment.

Although various embodiments of systems and methods for acquiring scale and point-to-point distance information for objects undergoing non-destructive inspection are described in some detail later herein, one or more of those embodiments may be characterized by one or more of the following aspects.

One aspect of the subject matter disclosed in detail below is a method for operating an unmanned aerial vehicle, comprising: (a) controlling an unmanned aerial vehicle to fly toward a structure; (b) using first and second laser range meters on-board the unmanned aerial vehicle to repeatedly measure first and second distances respectively separating the first and second laser range meters from respective first and second spots on a surface of the structure while the unmanned aerial vehicle is flying; (c) calculating a first separation distance separating the unmanned aerial vehicle from the structure based at least on the first and second distances; (d) determining whether the first separation distance equals a goal offset; (e) controlling the unmanned aerial vehicle to hover at a first location separated from the structure by the first separation distance in response to a determination in step (d) that the separation distance is equal to the goal offset; (f) using a camera on-board the unmanned aerial vehicle to capture an image of the structure while the unmanned aerial vehicle is hovering at the first location; and (g) displaying the image on the display screen. In accordance with one embodiment, the method further comprises: computing an orientation angle of a focal axis of the camera relative to a line connecting the first and second spots on the surface of the structure based on the first and second distances; calculating a scale factor for the first image when displayed on the display screen based at least in part on the separation distance and the orientation angle; and displaying a scale indicator overlaid on the image, a value or a length of the scale indicator representing the scale factor.

Another aspect of the subject matter disclosed in detail below is a method for operating an unmanned aerial vehicle, comprising: (a) controlling an unmanned aerial vehicle to hover at a location separated from a structure to be inspected; (b) directing first and second laser pointers pivotably mounted on-board the unmanned aerial vehicle in parallel toward a surface of the structure, the respective pivot axes of the first and second laser pointers being separated by a fixed distance; (c) using the mutually parallel first and second laser pointers to transmit mutually parallel laser beams onto first and second spots respectively while the unmanned aerial vehicle is hovering at the location; (d) using a camera on-board the unmanned aerial vehicle at a first time to capture a first image of a portion of the surface of the structure that includes the first and second spots; (e) pivoting the first and second laser pointers by a predefined angle while the unmanned aerial vehicle is hovering so that the first and second laser pointers are no longer parallel; (f) using the pivoted first and second laser pointers to transmit non-parallel laser beams onto respective third and fourth spots on the surface of the structure while the unmanned aerial vehicle is hovering at the location; (g) using the camera at a second time to capture a second image of the portion of the surface of the structure that includes the third and fourth spots; and (h) processing the first and second images to calculate a first separation distance separating the unmanned aerial vehicle from the structure based on the positions of the third and fourth spots in the images, the predefined angle and the fixed distance separating the pivot axes of the laser pointers. In accordance with one embodiment, step (h) further comprises calculating a second separation distance separating respective centers of the third and fourth spots, the method further comprising calculating a scale factor for the first and second images when displayed on a display screen of the computer system at the ground workstation based on the second separation distance.

A further aspect of the subject matter disclosed in detail below is a method for sizing a feature of a structure using an unmanned aerial vehicle comprising a pan-tilt mechanism that supports a camera and a laser range meter and an inertial measurement unit, the method comprising: (a) controlling the unmanned aerial vehicle to fly toward and then hover at a first location which is separated from a structure to be inspected; (b) aiming the laser range meter at a first point corresponding to a first visible feature on a surface of the structure while the unmanned aerial vehicle is hovering at the first location and acquiring a first distance measurement; (c) using the pan-tilt mechanism to measure the respective pan and tilt angles of the laser range meter when the laser range meter is aimed at the first point; (d) converting the distance and angle measurements acquired in steps (b) and (c) into a first vector representing the location of the first point in the frame of reference of the unmanned aerial vehicle at the first location; (e) aiming the laser range meter at a second point corresponding to a second visible feature on the surface of the structure while the unmanned aerial vehicle is hovering at a second location and acquiring a second distance measurement; (f) using the pan-tilt mechanism to measure the respective pan and tilt angles of the laser range meter when the laser range meter is aimed at the second point; (g) converting the distance and angle measurements acquired in steps (e) and (f) into a second vector representing the location of the second point in the frame of reference of the unmanned aerial vehicle at the second location; (h) using an inertial measurement unit to measure acceleration and rotational rate of the unmanned aerial vehicle during flight from the first location to the second location; (i) generating a transformation matrix representing a position difference and an orientation difference between the first and second locations of the unmanned aerial vehicle based on information acquired in step (h); (j) multiplying the second vector by the transformation matrix to form a third vector representing the location of the second point in the frame of reference of the unmanned aerial vehicle at the first location; and (k) calculating a distance between the first and second points using the first and third vectors.

In accordance with one embodiment, the method described in the preceding paragraph further comprises: (l) transmitting one or more messages containing measurement data acquired in steps (b), (c), (e), (f) and (h) from the unmanned aerial vehicle; (m) receiving the one or more messages at a computer system at a ground station; and (n) extracting the measurement data from the message, wherein steps (d), (g) and (i) through (k) are performed by the computer system at the ground workstation. This method may further comprise: using the camera to capture an image of a portion of the surface of the structure that includes the first and second visible features while the unmanned aerial vehicle is hovering at the first location; and displaying the image and symbology representing a value of the distance calculated in step (k) overlaid on the image on a display screen of the computer system at the ground workstation. For example, the first and second visible features may be respective endpoints of an anomaly in the structure.

Yet another aspect of the subject matter disclosed herein is an unmanned aerial vehicle comprising: a frame; a plurality of rotors rotatably mounted to the frame; a plurality of motors respectively coupled to drive rotation of the rotors of the plurality of rotors; a motor controller for controlling operation of the plurality of motors; a pan-tilt mechanism mounted to the frame; a camera mounted to the pan-tilt mechanism; a laser range meter mounted to the pan-tilt mechanism; a computer system configured to send commands to the motor controller, control operation of the pan-tilt mechanism, and selectively activate the camera and the laser range meter; an inertial measurement unit mounted to the frame and configured to send linear acceleration and rotation rate data to the computer system; and a transceiver configured to enable communication between the computer system and a ground station. In accordance with some embodiments, the computer system is further configured to: receive image data from the camera, pan and tilt angle data from the pan-tilt mechanism, distance data from the laser range meter, and linear acceleration and rotation rate data from the inertial measurement unit; determine a first location of the unmanned vehicle relative to a structure; send a first command to the motor controller to fly the unmanned aerial vehicle from the first location to a second location whereat the camera is separated from a surface of the structure by a goal offset; and send a second command to the motor controller to fly the unmanned aerial vehicle from the second location to a third location whereat the camera is separated from a surface of the structure by the goal offset and a focal axis of the camera is perpendicular to the surface of the structure.

A further aspect is an unmanned aerial vehicle comprising: a frame; a plurality of rotors rotatably mounted to the frame; a plurality of motors respectively coupled to drive rotation of the rotors of the plurality of rotors; a motor controller for controlling operation of the plurality of motors; a camera; first, second and third laser pointers; a computer system configured to send commands to the motor controller and selectively activate the camera and the first through third laser pointers; and a transceiver configured to enable communication between the computer system and a control station, wherein the first and second laser pointers are fixed to the frame in a mutually parallel relationship, and the third laser pointer is pivotably coupled to the frame.

Other aspects of systems and methods for acquiring scale and point-to-point distance information for objects in an environment using a remotely operated flying platform are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

For the purpose of illustration, systems and methods for acquiring scale and point-to-point distance information for objects undergoing aerial non-destructive inspection using a UAV will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
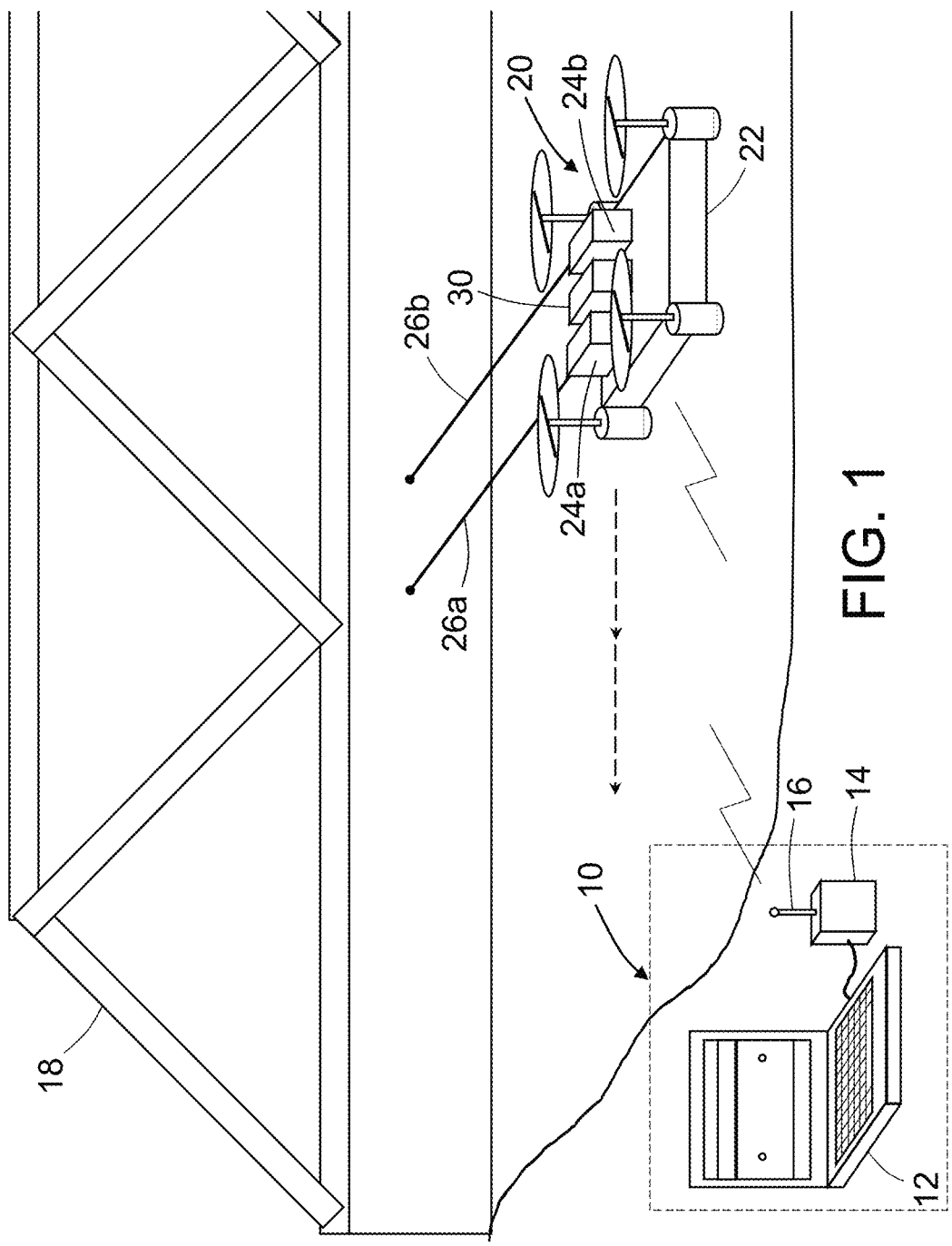
FIG. 1 is a diagram showing a system for inspecting a bridge using an airborne UAV having a pair of laser devices and a camera on-board in accordance with some embodiments.

FIG. 1 is a diagram showing a system in accordance with some embodiments for inspecting a bridge 18. The system includes an unmanned aerial vehicle 20 (hereinafter "UAV 20") that may be moved (flown) around a structure requiring periodic inspection. In this example the UAV 20 is a rotorcraft. While the structure being inspected is illustrated as a bridge 18, the system is equally well adapted for use in inspecting a wide range of other structures including, but not limited to, power lines, power-generating facilities, power grids, dams, levees, stadiums, large buildings, large antennas and telescopes, water treatment facilities, oil refineries, chemical processing plants, high-rise buildings, and infrastructure associated with electric trains and monorail support structures. The system is also particularly well suited for use inside large buildings such as manufacturing facilities and warehouses. Virtually any structure that would be difficult, costly, or too hazardous to inspect by a human controlling the inspection device or the platform carrying the inspection device may potentially be inspected using the system depicted in FIG. 1.

For inspection applications, a rotorcraft is preferred due to its ability to hover and move at very slow speeds. The vertical take-off and landing capability of remote-controlled unmanned rotorcraft also may be highly advantageous in many applications, especially when operating inside of structures or facilities such as manufacturing plants, warehouses, etc., or when inspecting complex facilities such as oil refineries or chemical processing that may have many tall structures (e.g., smoke stacks) clustered closely together. The ability to hover and/or move only vertically enables remote-controlled unmanned rotorcraft to fly close to and inspect large vertical structures such as vertical support posts of bridges, antennas or vertical surfaces of dams.

In accordance with some embodiments (disclosed in more detail below), the UAV 20 comprises a frame 22 that supports a pair of laser devices 24a and 24b arranged on opposite sides of a camera 30. The camera 30 may comprise a still camera (color and/or black and white) to obtain still images, a video camera to obtain color and/or black and white video, or an infrared camera to obtain infrared still images or infrared video of portions of bridge 18. The laser devices 24a and 24b emit respective laser beams 26a and 26b which are directed toward a portion of the bridge 18. As will be explained in some detail below, the impingement of laser beams 26a and 26b on a surface of the bridge enables the acquisition of information concerning the location of the UAV 20 relative to the bridge 18.

The system depicted in FIG. 1 further comprises a remote control station 10 for sending and receiving wireless communications to and from the UAV 20. In accordance with one embodiment, the remote control station 10 comprises a laptop computer 12, a transceiver 14 and an antenna 16. The transceiver 14 is in communication with the antenna 16 for enabling communication between the laptop computer 12 and the UAV 20.

The on-board system of the UAV 20 may further comprise a guidance and control hardware and software system (not shown in FIG. 1) that is able to implement one or more different, stored flight plans digitally represented by flight plan data stored in a non-transitory tangible computer-readable storage medium (not shown in FIG. 1). The on-board system may further comprise a global positioning system/inertial navigation system (GPS/INS) for controlling the orientation of UAV 20 and assisting in carrying out the preprogrammed flight plan stored in memory. A wireless transceiver and an on-board antenna (not shown in FIG. 1) enable bidirectional, wireless electromagnetic wave communications with the remote control station 10.

Unmanned aerial vehicles of the type depicted in FIG. 1 may be upgraded with the capability to acquire scale and point-to-point distance information for objects undergoing non-destructive inspection. The UAV may be provided with on-board sensors and processing techniques to provide discrete or continuous measurements of the distances between points on a target object or the scale of the target object. Various embodiments of such an enhanced-capability UAV will now be described in some detail.

Figure 2:
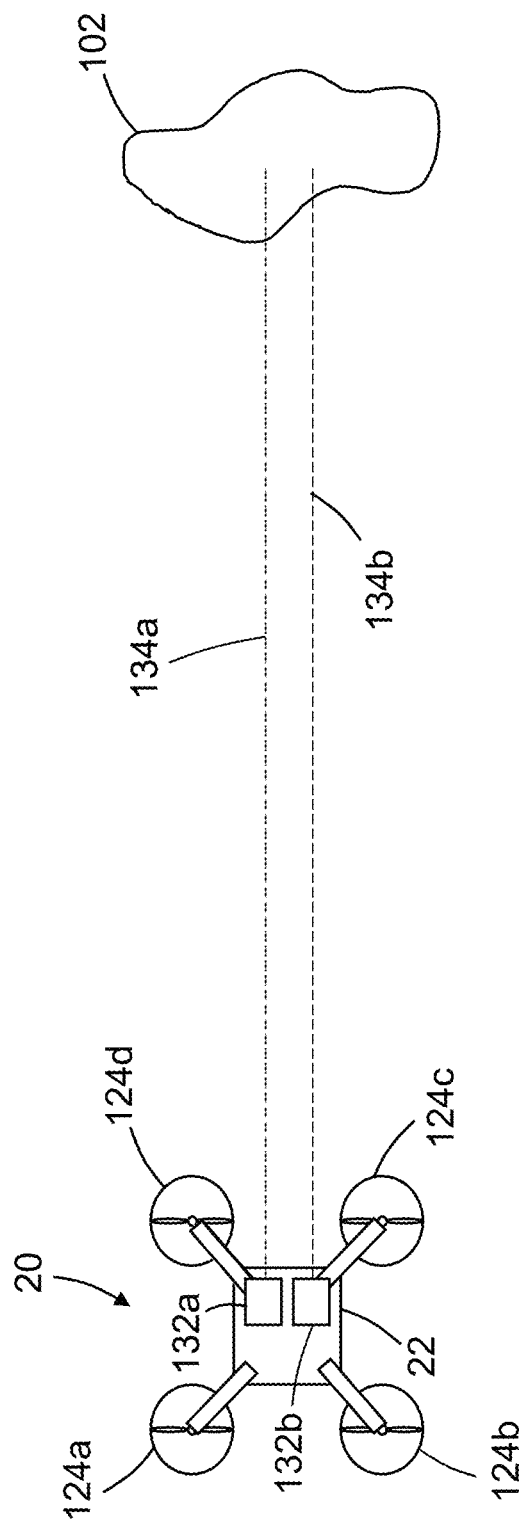
FIG. 2 is a diagram showing a top view of an airborne UAV having a pair of fixed laser pointers directed at a target object in accordance with one embodiment. A camera on-board the UAV is not shown.

FIG. 2 is a diagram showing a top view of one embodiment of an airborne UAV 20 that is capable of acquiring scale and point-to-point distance information for objects undergoing non-destructive inspection. The UAV 20 comprises a pair of laser pointers 132a and 132b arranged in a parallel configuration. The laser pointers 132a and 132b emit respective laser beams along respective optical paths indicated by respective aim direction vectors 134a and 134b. The UAV 20 further comprises a digital video camera (not shown in FIG. 2). The laser pointers 132a and 132b and the video camera are used to calculate distance to target object 102 and reference scale. This embodiment is used for situations where the UAV 20 is relatively close to the target object 102.

The UAV 20 depicted in FIG. 2 comprises a frame 22 and four rotors 124a-124d rotatably mounted to the frame 22. Rotation of each rotor is driven by a respective motor (not shown in FIG. 2) mounted to the frame 22. The pair of laser pointers 132a and 132b having mutually parallel axes are fixedly mounted to the frame 22. When activated, the laser pointers 132a and 132b direct respective mutually parallel laser beams at respective laser spots on a surface of a target object 102. Although not shown in FIG. 2, the UAV 20 also comprises a video camera 130 (see FIG. 3) mounted to the frame 22. Preferably the focal axis of the video camera 130 and the aim directions of the laser pointers 132a and 132b are mutually parallel.

The video camera 130 may be activated to capture an image in which the two laser spots are visible. This image data can be processed (as described in some detail below) to derive pixel information which, in conjunction with the known distance separating the axes of the two laser pointers 132a and 132b, can be used to determine a scale factor. That scale factor can then be used to display a scale indicator on any subsequent image captured by the video camera 130 while the UAV is hovering at the same location. More specifically, one goal is to determine the distance D between the pointers 132a and 132b and the target object 102, as will be described in more detail below with reference to FIGS. 4A and 4B.

Figure 3:
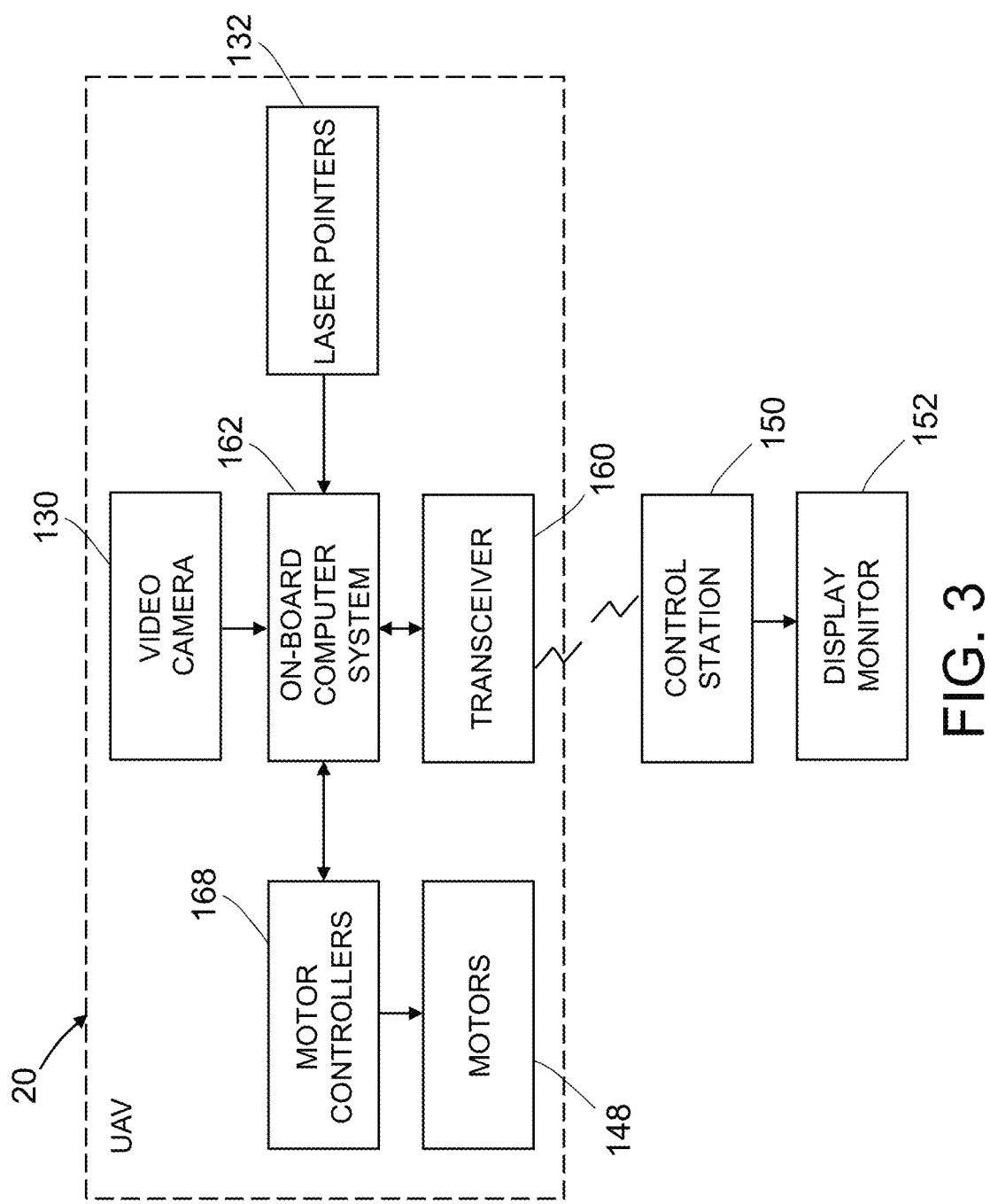
FIG. 3 is a block diagram identifying some components of a system for performing non-destructive inspection of a structure using a remote-controlled UAV having two or more laser pointers. The configuration of the laser pointers may be selected from the alternative embodiments depicted in FIGS. 2, 6 and 8.

FIG. 3 is a block diagram identifying some components of a system for performing non-destructive inspection of a structure using a remote-controlled UAV 20 having two or more laser pointers 132 (e.g., a first laser pointer 132a and a second laser pointer 132b as seen in FIG. 2) mounted thereon. In this example, the UAV 20 and the equipment carried by the UAV 20 are controlled by the on-board computer system 162 as a function of radiofrequency commands transmitted by a control station 150. Those radiofrequency commands are received by a transceiver 160 on-board the UAV 20, converted into the proper digital format and then forwarded to the computer system 162. The control station 150 may comprise a general-purpose computer system configured with programming for controlling operation of the UAV 20 and the equipment on-board the UAV 20 by sending commands to the computer system 162. For example, the control station may send commands controlling the flight of the UAV 20 and commands for activation of the laser pointers 132. In addition, the computer system at the control station 150 is configured with programming for processing data received from the UAV 20 during an inspection operation. In particular, the computer system of the control station 150 may comprise a display processor configured with software for controlling a display monitor 152 to display images acquired by the video camera 130. The optical image field, as sighted by the video camera 130, can be displayed on the display monitor 152.

In response to commands from the control station 150, the video camera 130 and the laser pointers 132 can be activated by control signals (e.g., via electrical cables) transmitted by the computer system 162. The video camera 130 may have automated (remotely controlled) zoom capabilities. The computer system 162 also controls the flight of the UAV 20 by sending commands to the motor controllers 168 which respectively control the rotation of respective motors 148 that drive rotation of rotors 124a-124d (see FIG. 2).

Figure 4A:
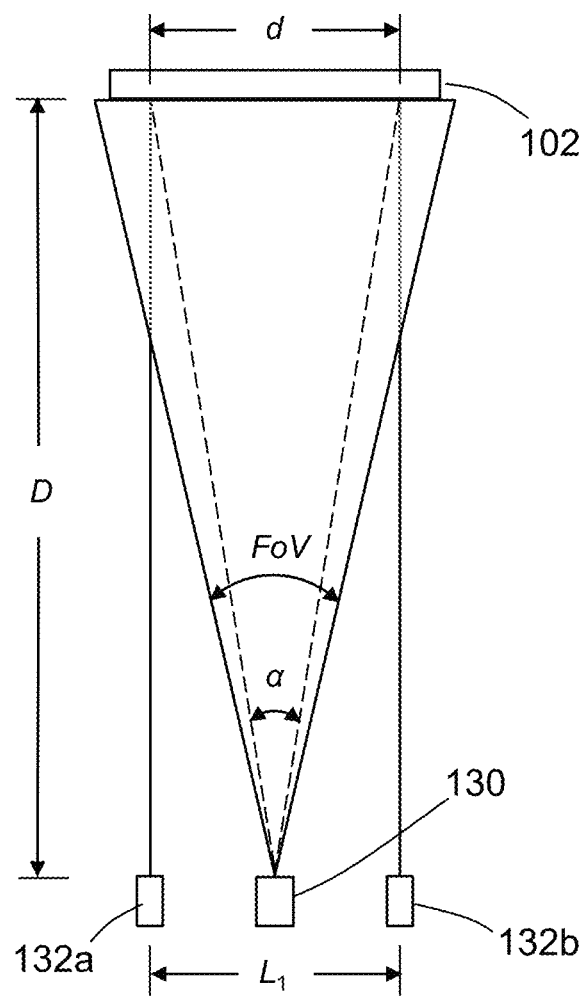
FIG. 4A is a diagram showing a video camera and a pair of fixed laser pointers separated from a target object by the distance D, which laser pointers produce respective laser spots separated by a distance d on the surface of the target object.
Figure 4B:
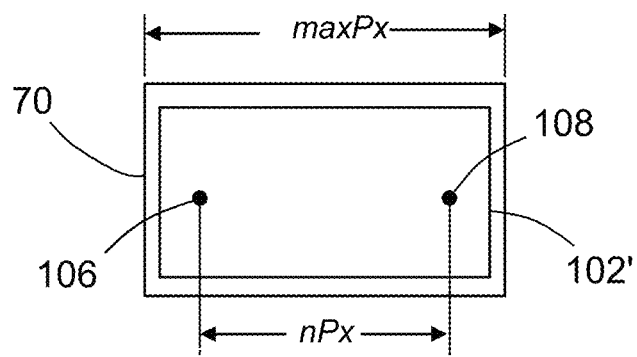
FIG. 4B is a diagram representing an image acquired by the video camera depicted in FIG. 4A, which image contains a representation of the target object.

FIG. 4A is a diagram showing a video camera 130 and a pair of laser pointers 132a and 132b separated from a target object 102 by the distance D, which laser pointers produce respective laser spots on the surface of the target object 102. These laser spots on the target object surface are separated by the distance d. FIG. 4B is a diagram representing an image 70 acquired by the video camera 130 depicted in FIG. 4A, which image 70 includes a representation 102' of the target object 102 and respective representations of the respective positions 106 and 108 of the laser spots.

In accordance with the situation depicted in FIGS. 4A and 4B, the known variables are the current field-of-view of the video camera 130 (i.e., "FoV" in FIG. 4A), the maximum number of pixels in the width direction of the image 70 (i.e., "maxPx" in FIG. 4B), the number of pixels in the image 70 between the respective groups of pixels representing positions 106 and 108 of the laser spots produced by laser pointers 132a and 132b (i.e., "nPx," in FIG. 4B); and the distance separating the laser pointers 132a and 132b (i.e., "$L_1$" in FIG. 4A). The unknown variables are the viewing angle α between the laser spots and the distances D and d.

The viewing angle α between the laser spots can be computed using the camera field-of-view (FoV) and image pixel data:

$$\alpha = 2 * \mathrm{atan}\left(\frac{nPx}{maxPx} * \tan\left(\frac{FoV}{2}\right)\right) \quad (1)$$

where nPx is the measured number of pixels between laser spots, and maxPx is the image width in pixels. Then the distances d and D can be computed using the following equations:

$$d = L_1$$

$$D = \frac{L_1/2}{\tan(\alpha/2)}$$

Substituting Eq. (1) for the viewing angle α, one obtains:

$$D = \frac{L_1/2}{\frac{nPx}{maxPx} * \tan\left(\frac{FoV}{2}\right)}$$

In accordance with the embodiment depicted in FIGS. 2 and 4A (and other embodiments described hereinafter), the value of the distance D is updated continuously.

In accordance with one possible implementation, the value of the distance d may be included anywhere in the image 70 displayed on the display monitor (item 152 in FIG. 3). In accordance with another possible implementation, a scale factor can be calculated based on a ratio of the distance d and the number of pixels nPx and a scale bar or other scale indicator indicating the scale factor can be included as part of the image 70. This scale indicator will be accurate so long as the UAV-target object separation distance D is up-to-date. As that separation distance changes, the operations described above can be repeated to generate an updated scale factor. Over time, the scale indicator is repeatedly adjusted as a function of the variable distance separating the UAV and the target object.

For the purpose of non-destructive inspection, preferably the acquired images of the inspected structure do not include representations of laser spots. Accordingly, following the initial sizing of the imaged surface area of the target object, the video camera 130 can be activated to capture additional images (e.g., a video sequence of images) while the laser pointers 132a and 132b are de-activated. In this case, the video camera 130 preferably captures images while the separation distance D is up-to-date.

Figure 5:
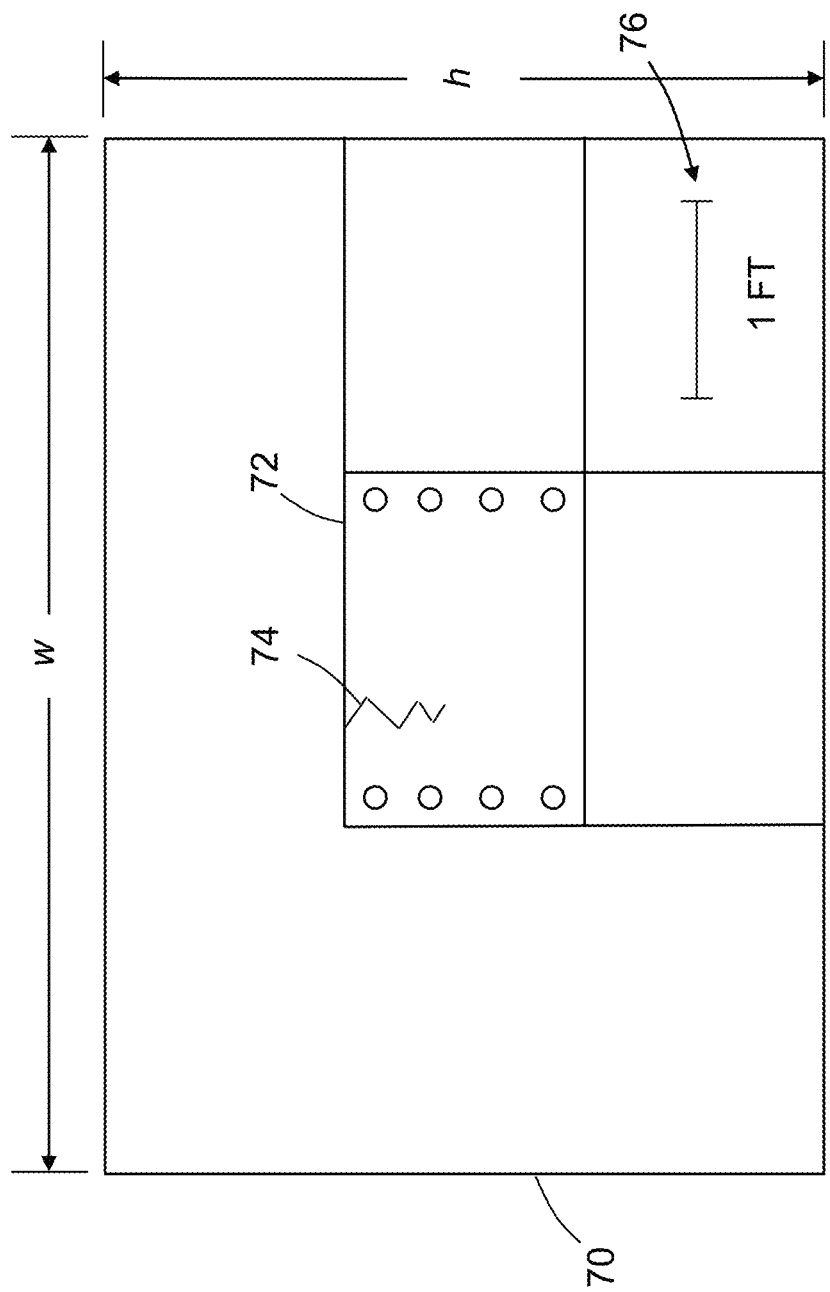
FIG. 5 is a diagram representing an image containing a representation of a portion of a structure having a visible anomaly and having a scale bar overlaid thereon.

For example, FIG. 5 is a diagram representing an image 70 that includes a representation of a portion of a structure 72 having a visible anomaly 74 and a scale bar 76, but does not include any representations of laser spots. A technician at the control station 150 can view this image while appreciating the applicable size of the imaged area as indicated by the scale bar 76. In addition, visible anomalies can be roughly (i.e., approximately) sized by comparing a visible dimension of the anomaly to a visible dimension of the scale indicator appearing on the display screen.

Figure 6:
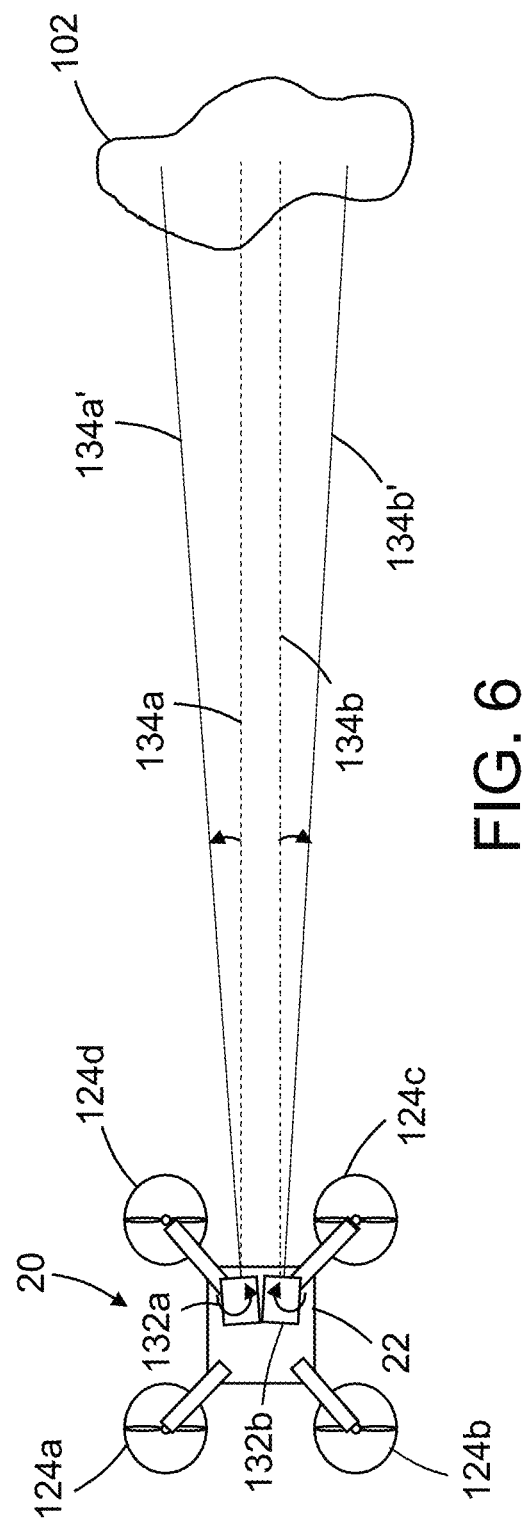
FIG. 6 is a diagram showing a top view of an airborne UAV having a pair of pivotable laser pointers directed at a target object in accordance with another embodiment. A camera on-board the UAV is not shown.

FIG. 6 is a diagram showing a top view of an airborne UAV 20 in accordance with an alternative embodiment. Like the embodiment partly depicted in FIG. 3, the embodiment partly depicted in FIG. 6 is also capable of acquiring scale and point-to-point distance information for objects undergoing non-destructive inspection. The UAV 20 partly depicted in FIG. 6 comprises a pair of pivotable laser pointers 132a and 132b and a video camera 130 (not shown in FIG. 6). When activated, the laser pointers 132a and 132b direct respective laser beams at respective laser spots on a surface of a target object 102. The laser pointers 132a and 132b may be independently pivotable or their pivoting mechanism may be coupled so that the laser pointers 132a and 132b are oppositely pivotable. As used herein, the phrase "oppositely pivotable" means that the angular positions of the laser pointers 132a and 132b relative to the focal axis (not shown in FIG. 6) of the video camera 130 pivot are equal and opposite at all times.

The laser pointers 132a and 132b can be rotated on-board the UAV 20 by a known amount relative to the parallel configuration. This creates additional separation between the laser spots on the target object 102, which is useful for situations where the UAV 20 is further from the target object 102 than may be the case for the embodiment depicted in FIG. 2. For example, initially the laser pointers 132a and 132b are positioned in parallel to emit respective laser beams along mutually parallel optical paths indicated by respective aim direction vectors 134a and 134b. Then the laser pointers 132a and 132b are rotated by a known angle and then activated again to emit respective laser beams along optical paths indicated by respective aim direction vectors 134a' and 134b'. The distance to the target object 102 can be determined using images captured by the on-board video camera (not shown), which images include the groups of pixels representing the laser spots. More specifically, this embodiment is configured to determine the distance d between the laser spots respectively produced on the target object 102 by the laser pointers 132a and 132b; and the distance D between the pointers 132a and 132b and the target object 102, as will be described in more detail below with reference to FIGS. 7A and 7B.

Figure 7A:
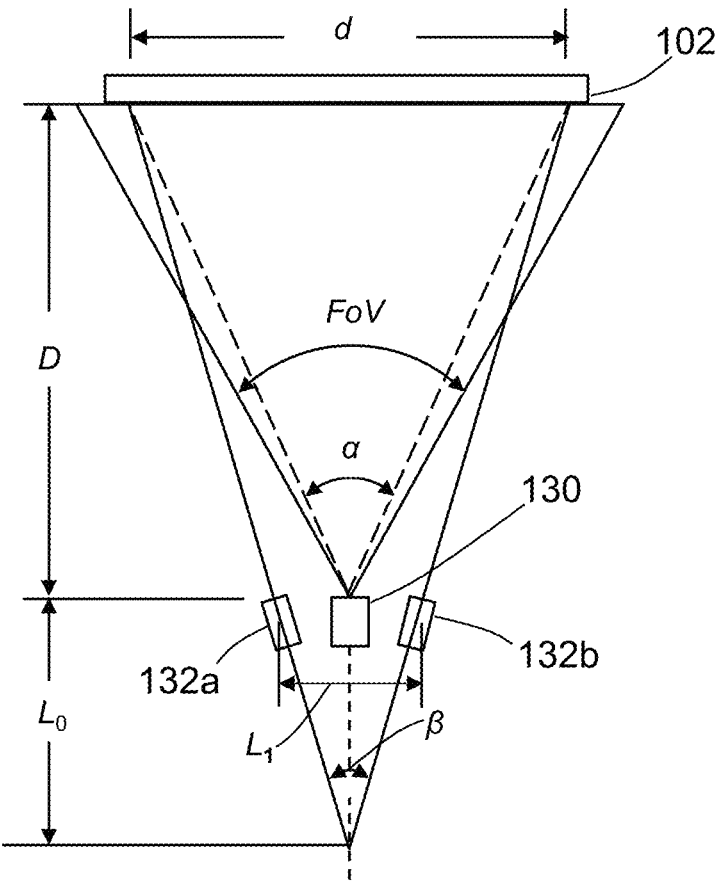
FIG. 7A is a diagram showing a video camera and a pair of pivotable laser pointers separated from a target object by the distance D, which laser pointers produce respective laser spots separated by a distance d on the surface of the target object.
Figure 7B:
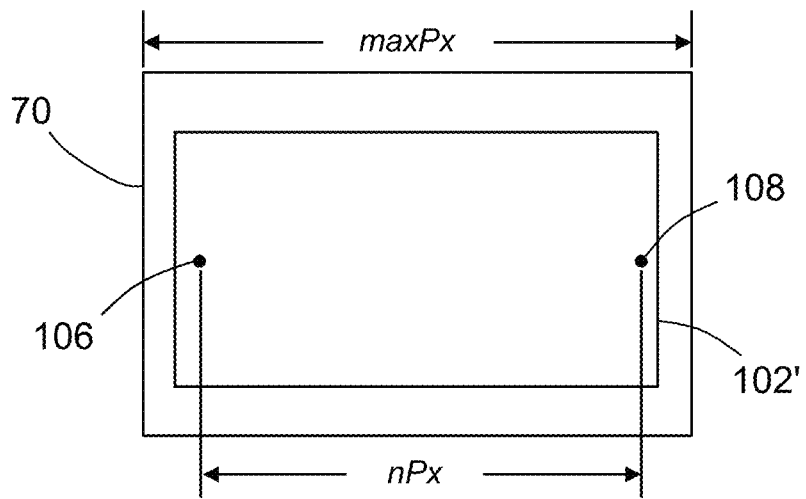
FIG. 7B is a diagram representing an image acquired by the video camera depicted in FIG. 7A, which image contains a representation of the target object.

FIG. 7A is a diagram showing a video camera 130 and a pair of pivotable laser pointers 132a and 132b separated from a target object 102 by the distance D, which laser pointers produce respective laser spots on the surface of the target object 102. These laser spots on the target object surface are separated by the distance d. FIG. 7B is a diagram representing an image 70 acquired by the video camera 130 depicted in FIG. 7A, which image 70 includes a representation 102' of the target object 102 and respective groups of pixels representing respective positions 106 and 108 of the laser spots.

In accordance with the situation depicted in FIGS. 7A and 7B, the known variables are the field-of-view of the video camera 130 (i.e., "FoV" in FIG. 7A), the maximum number of pixels in the width direction of the image 70 (i.e., "maxPx" in FIG. 7B), the number of pixels between the respective groups of pixels representing positions 106 and 108 of the laser spots produced by laser pointers 132a and 132b (i.e., "nPx," in FIG. 7B), the angle between the laser beams transmitted by the laser pointers 132a and 132b (i.e., "β" in FIG. 7A); and the distance separating the respective pivot axes of the laser pointers 132a and 132b (i.e., "L₁" in FIG. 7A). The unknown variables are the viewing angle α between the laser spots and the distances D and d.

The viewing angle α between the laser spots can again be computed using Eq. (1). Then the distances d and D can be computed using the following equations:

$$d = \frac{2 * L_1 * \sin(\alpha/2) * \cos(\beta/2)}{\sin\left(\frac{\alpha - \beta}{2}\right)}$$

$$D = \frac{d}{2 * \tan(\alpha/2)}$$

In accordance with one possible implementation, a scale factor can be calculated based on a ratio of the distance d and the number of pixels nPx and a scale bar or other scale indicator indicating the scale factor can be displayed on subsequent images captured by the video camera 130 while the UAV 20 hovers at the same location.

Figure 8:
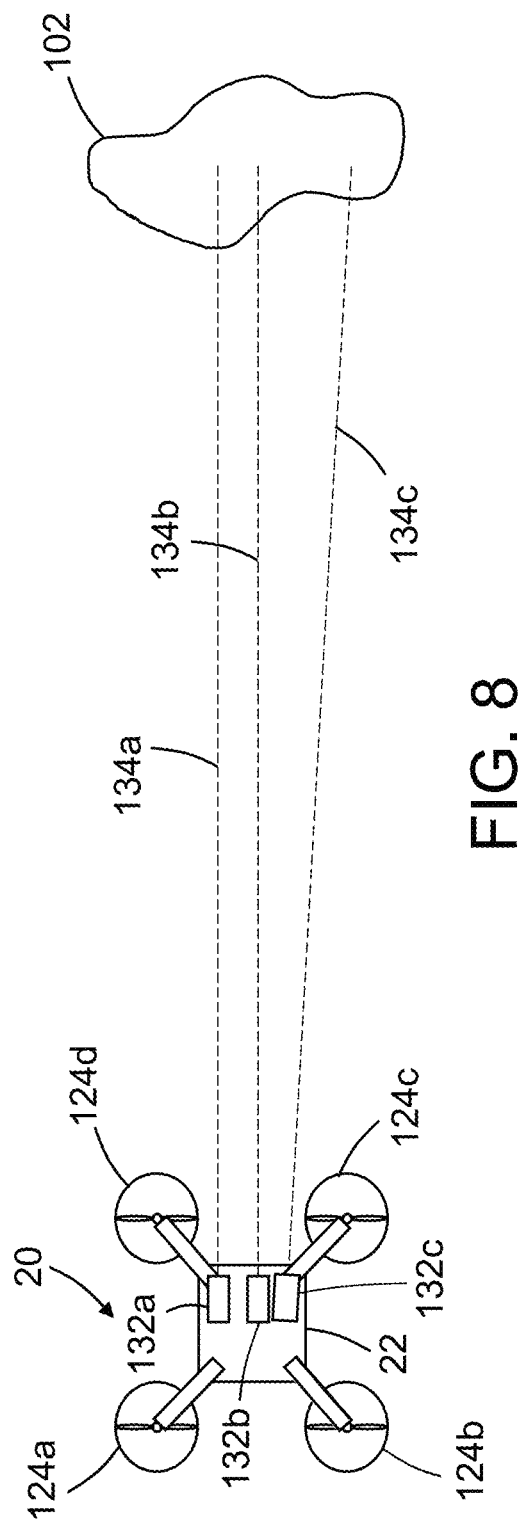
FIG. 8 is a diagram showing a top view of an airborne UAV having a pair of fixed laser pointers (a first color) and a pivotable (about a single axis) third laser pointer (a second color) directed at a target object in accordance with a further embodiment. A camera on-board the UAV is not shown.

FIG. 8 is a diagram showing a top view of an airborne UAV 20 having a pair of fixed laser pointers 132a and 132b and a pivotable (about a single axis) third laser pointer 132c directed at a target object 102. A camera on-board the UAV is not shown. In accordance with this variation, the two laser pointers 132a and 132b are mutually parallel and the third laser pointer 132c is rotated at a fixed or controllable angle relative to the other two. The third laser pointer 132c may emit laser light having a different color than the laser light emitted by laser pointers 132a and 132b to help differentiate the laser spots from each other on the target object 102. (In the alternative, this computational method can be made to use three laser pointers of the same color.) The laser pointers 134a and 134b emit respective laser beams along mutually parallel optical paths indicated by respective aim direction vectors 134a and 134b, while the third laser pointer 132c emits a laser beam along the optical path indicated by aim direction vector 134a in FIG. 8.

Figure 9A:
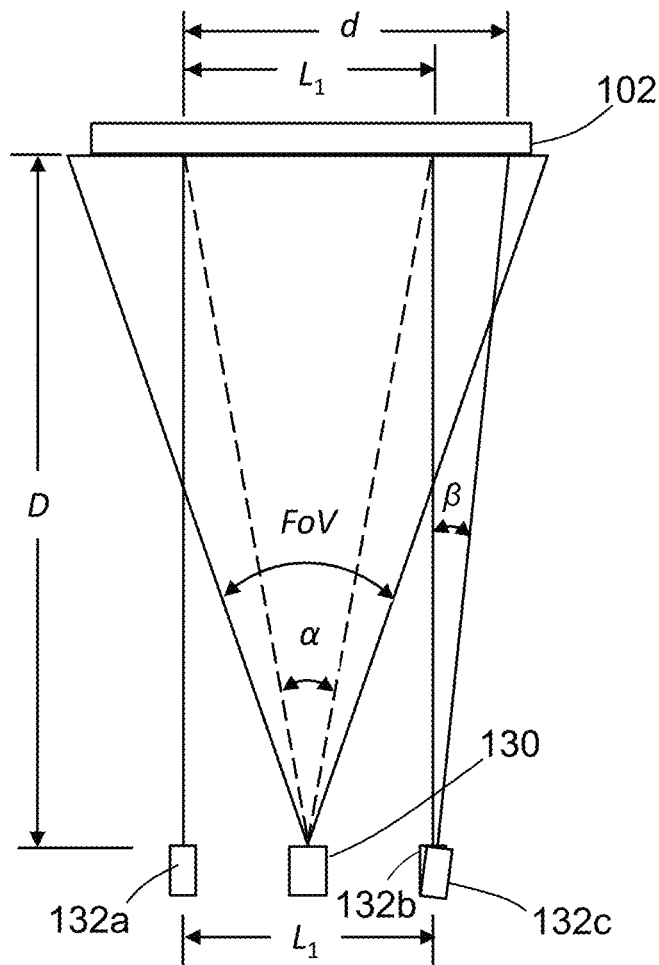
FIG. 9A is a diagram showing a video camera and three laser pointers configured as depicted in FIG. 8 and separated from a target object by the distance D, which laser pointers produce respective laser spots, the furthest apart of which are separated by a distance d on the surface of the target object.
Figure 9B:
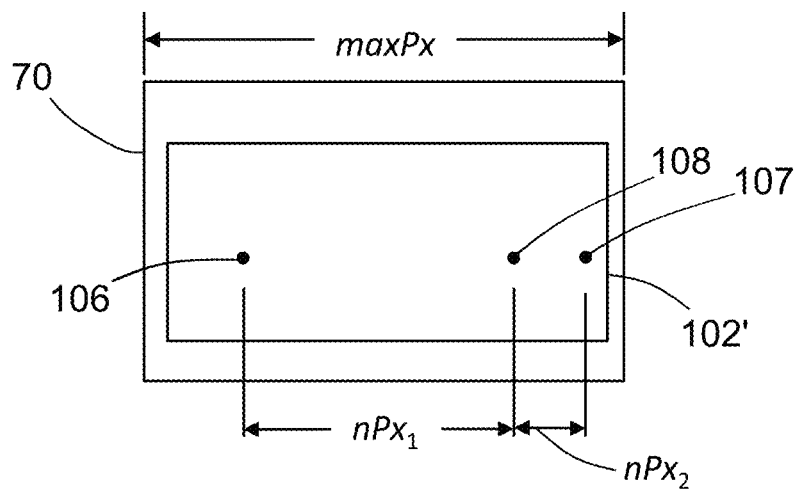
FIG. 9B is a diagram representing an image acquired by the video camera depicted in FIG. 9A, which image contains a representation of the target object.

FIG. 9A is a diagram showing a video camera 130 and three laser pointers 132a-c configured as depicted in FIG. 8 and separated from a target object 102 by the distance D, which laser pointers 132a-c produce respective laser spots, the furthest apart of which are separated by a distance d on the surface of the target object 102. The laser spots produced on the target object surface by mutually laser pointers 132a and 132b are separated by the distance L₁, which is also the physical distance separating the axes of laser pointers 132a and 132b. The laser spots produced on the target object surface by laser pointers 132a and 132b are separated by the distance d. FIG. 9B is a diagram representing an image 70 acquired by the video camera 130 depicted in FIG. 9A, which image 70 includes a representation 102' of the target object 102 and respective groups of pixels representing respective positions 106, 107 and 108 of the laser spots.

In accordance with the situation depicted in FIGS. 9A and 9B, the known variables are the field-of-view of the video camera 130 (i.e., "FoV" in FIG. 9A), the maximum number of pixels in the width direction of the image 70 (i.e., "maxPx" in FIG. 9B), the number of pixels between the respective groups of pixels representing respective positions 106 and 108 of the laser spots produced by laser pointers 132a and 132b (i.e., "nPx₁" in FIG. 9B); the number of pixels between the respective groups of pixels representing respective positions 108 and 107 of the laser spots produced by laser pointers 132b and 132c (i.e., "nPx₂," in FIG. 9B); the angle between the laser beams transmitted by the laser pointers 132b and 132c (i.e., "β" in FIG. 9A); and the distance separating the respective axes of the laser pointers 132a and 132b (i.e., "$L_1$" in FIG. 9A). The unknown variables are the viewing angle α between the laser spots and the distances D and d.

The viewing angle α between the laser spots produced by laser pointers 132a and 132b can again be computed using Eq. (1). Then the distances d and D can be computed using the following equations:

$$D = \frac{L_1/2}{\frac{nPx_1}{maxPx} * \tan\left(\frac{FoV}{2}\right)}$$

$$d = L_1 + D * \tan \beta$$

or $$d = L_1 + (nPx_1 + nPx_2)/nPx_1$$

Thus there are two ways to calculate d: one uses the angle β and the other uses $nPx_2$. Having two separate ways of calculating the value for distance d serves as a process check to improve reliability.

In accordance with one possible implementation, a scale factor can be calculated based on a ratio of the distance d and the sum ($nPx_1+nPx_2$). Thereafter a scale bar or other scale indicator indicating the scale factor can be displayed on subsequent images captured by the video camera 130 while the UAV 20 hovers at the same location.

In accordance with the embodiments partly depicted in FIGS. 4A, 4B, 7A, 7B, 9A and 9B, an image processing method is used to determine the distance in pixels between the images of the laser spots displayed on the image 70. The main goal of the image processing step is to determine the distance in pixels between laser spots on the target object. There are several methods that could be used for this, such as those using pixel color, but that approach is not very robust in environments that might have a wide variety of lighting conditions. For this application a process involving sequential images with the laser spots on in one image and off in the next is used. The method involves cycling the laser pointers on and off at a rate that is half the rate (or other integer divisor) of the video camera frame rate, and then performing an image subtraction step to identify contiguous clusters pixels that have changed. The difference between the centroids of the contiguous clusters will be the pixel distance (nPixels), which pixel distance can be used in conjunction with the distance d to calculate a scale factor and later display a scale indicator that graphically depicts that scale factor.

Change detection is a process used to determine the difference between two or more images. For example, regions of change can be determined using digital image processing techniques. One such process may involve image subtraction, blur filters, and image segmentation steps. The term "digital image processing" means a computer-based analysis of an image or series of images. The term "pixels" refers to picture elements that make up a 2-D digital image. Segmentation is the process of identifying pixels that have similar properties in a digital image.

Figure 10:
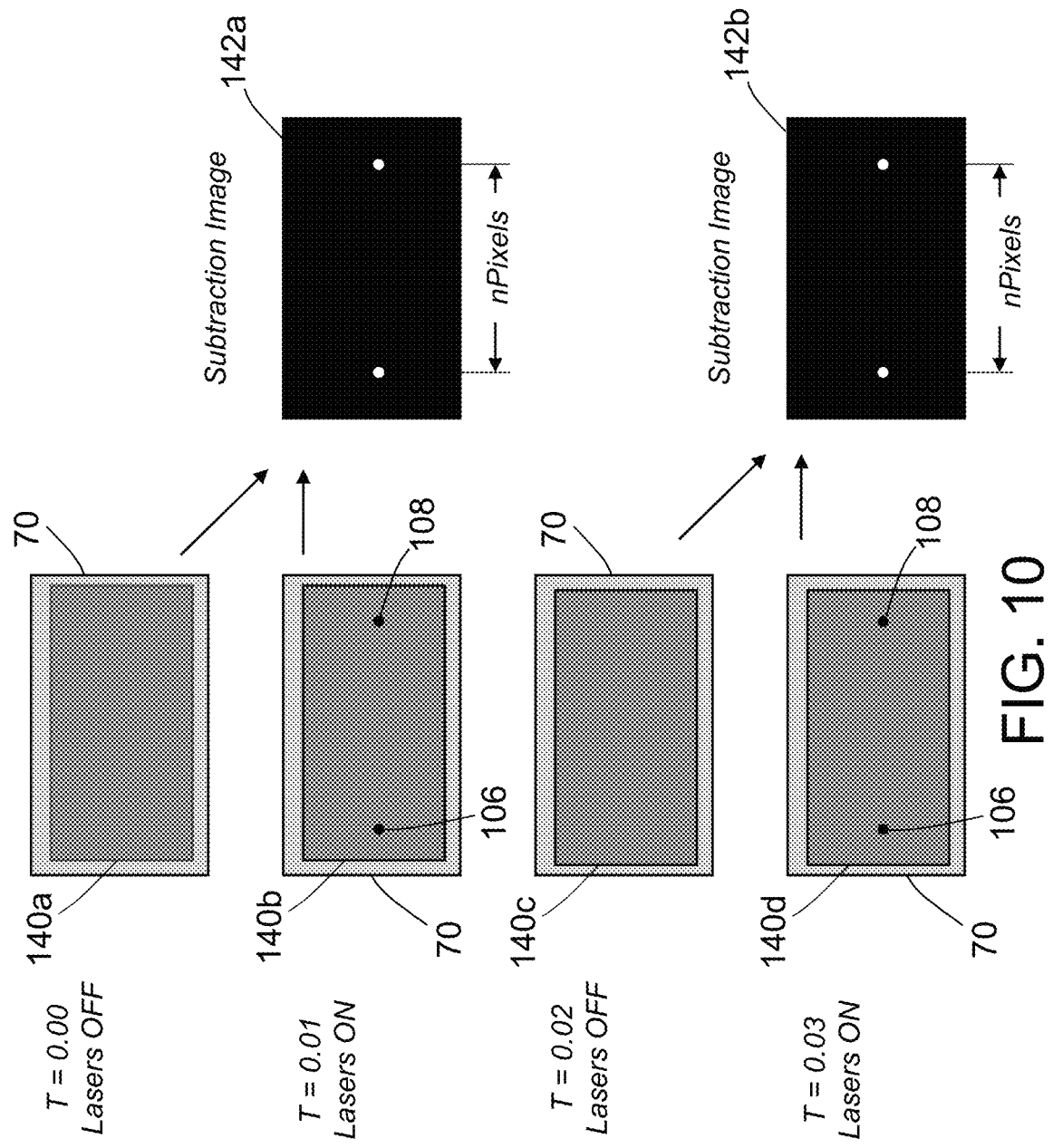
FIG. 10 is a diagram illustrating steps of a method for processing images to determine the distance in pixels between laser spots on a target object in accordance with one embodiment.

FIG. 10 is a diagram illustrating steps of a method for processing images to determine the distance in pixels between laser spots on a target object in accordance with one example. The video camera 130 captures respective frames 140a-d at times T=0.00, 0.01, 0.02 and 0.03. The laser pointers 132a and 132b are OFF when the frames 140a and 140c are captured at times T=0.00 and 0.02, but ON when the frames 140b and 140d are captured at times T=0.01 and 0.03. Frame 140b is subtracted from frame 140a to produce a subtraction image 142a; frame 140d is subtracted from frame 140c to produce a subtraction image 142b. The locations of differences in the subtraction images 142a and 142b are then determined. The centroid of each area is found and converted into pixel coordinates (x, y). A distortion correction is performed to compensate for the optics of the camera, where two-dimensional image corrections are applied resulting in (x', y'). This correction may depend on, for example, the lens optics, zoom, and focus levels. The corrections are determined experimentally in one embodiment, and recalled at run-time using a table lookup. After lighting correction is applied, the differences (i.e., the images of the laser spots) which appear in each subtraction image are determined. In one embodiment, a pixel-by-pixel difference operation is performed, followed by a blur filter operation, and then an image segmentation operation. An N×N blur filter (such as a 5×5 kernel) can be used to smooth out most of the high-frequency noise associated with the images, and can be adjusted to discard areas of various sizes. The blurred image is then segmented into distinct, non-touching areas. The centroid of each of the separate regions is computed and is stored in a list associated with each of the image pairs. The number of pixels separating the two centroids corresponding to the two laser spots is then calculated.

Figure 11:
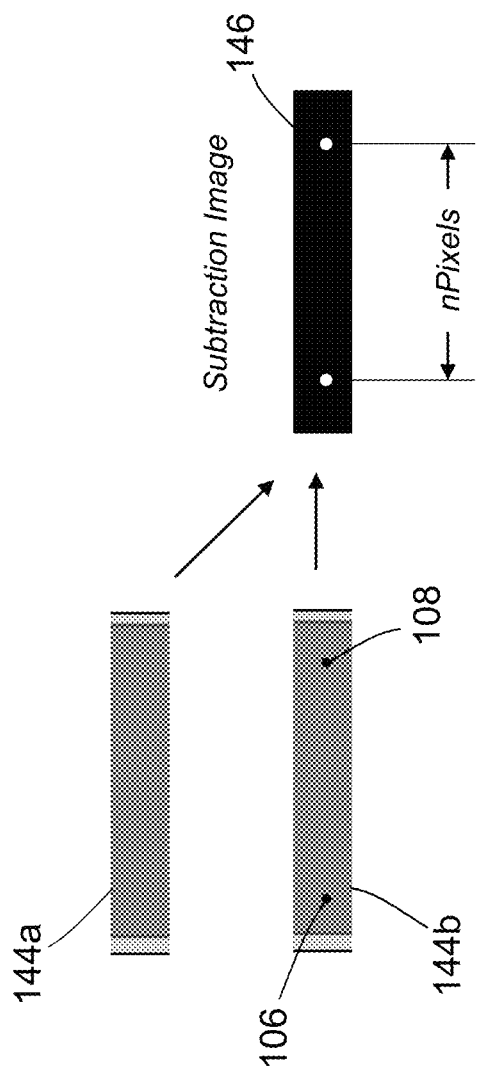
FIG. 11 is a diagram illustrating steps of a method for processing images to determine the distance in pixels between laser spots on a target object in a manner that improves the image processing efficiency.

Since the groups of pixels representing the respective positions 106 and 108 of the laser spots will be in the same horizontal strip of each image, only that part of the image is needed for the image processing. FIG. 11 is a diagram illustrating steps of a method for processing images to determine the distance in pixels between laser spots on a target object in a manner which improves the image processing efficiency. Horizontal strips 144a and 144b, for example, can be created from by frames 140a and 140b respectively. Horizontal strip 144b is then subtracted from horizontal strip 144a to form a subtraction image 146.

Another category of embodiments of the concept are configurations where UAV contains two or more laser range meters that enables: measurement of distance to the target, reference scale, as well as one or more orientation angle of the UAV relative to the target. If three non-collinearly mounted laser range meters are used (not shown here), more than one orientation angle can be measured (for example yaw and pitch).

Figure 12:
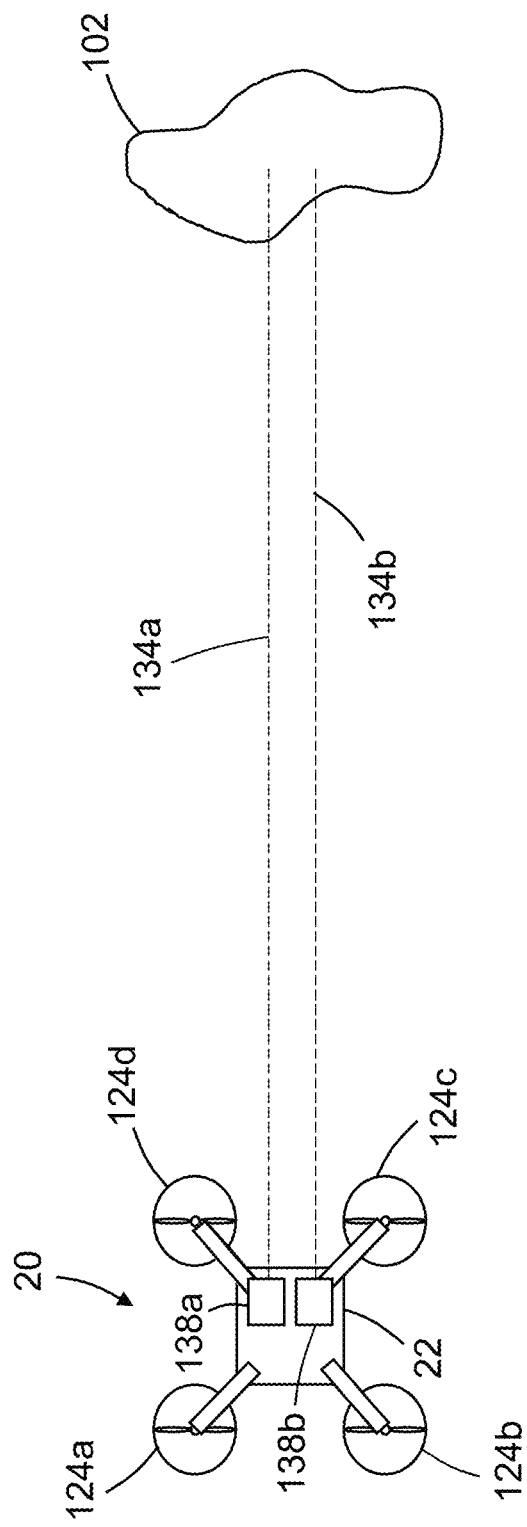
FIG. 12 is a diagram showing a top view of an airborne UAV having a pair of fixed laser range meters directed at a target object in accordance with another embodiment. A camera on-board the UAV is not shown.

FIG. 12 is a diagram showing a top view of an embodiment of an airborne UAV 20 that is capable of acquiring scale information for objects undergoing non-destructive inspection. It is also capable of measuring the separation distance D between the UAV 20 and the target object 102 and the orientation angle of the UAV 20 relative to target object 102. The architecture of the UAV 20 depicted in FIG. 12 may be similar to the architecture depicted in FIG. 3, except that a pair of laser range meters 138a and 138b arranged in a parallel configuration are substituted for the laser pointers 132.

The UAV 20 depicted in FIG. 12 comprises a frame 22 and four rotors 124a-124d rotatably mounted to the frame 22. Rotation of each rotor is driven by a respective motor (not shown in FIG. 12) mounted to the frame 22. The pair of laser range meters 138a and 138b having mutually parallel axes are fixedly mounted to the frame 22. When activated, the laser range meters 138a and 138b direct respective mutually parallel laser beams at respective laser spots on a surface of a target object 102. Although not shown in FIG. 12, the UAV 20 also comprises a video camera 130 (see FIG. 3) mounted to the frame 22. Preferably the focal axis of the video camera 130 and the aim directions of the laser range meters 138a and 138b are mutually parallel.

In instances wherein the axes of the laser range meters 138a and 138b are not perpendicular to the portion of the surface of target object 102 where the laser beams impinge, the respective distances separating the laser range meters 138a and 138b from that surface will not be equal and the UAV 20 will have a non-zero orientation angle relative to that surface. In instances wherein the axes of the laser range meters 138a and 138b are perpendicular to the portion of the surface of target object 102 where the laser beams impinge, the respective distances separating the laser range meters 138a and 138b from that surface will be equal and the orientation angle will be zero. Thus measurements of the respective separation distances of the laser range meters 138a and 138b from the target object 102 can be used to determine the current offset of the UAV 20 from the target object 102 and the current orientation angle and then control the UAV 20 to move in a manner that reduces both the deviation of the current offset from a goal offset and the deviation of the current orientation angle from a target orientation angle (e.g., an angle of zero degrees).

The video camera 130 may be activated to capture an image in which the two laser spots are visible. This image data can be processed (as described in some detail below) to derive pixel information which, in conjunction with the known distance separating the axes of the two laser range meters 138a and 138b, can be used to determine a scale factor. That scale factor can then be used to display a scale indicator on any subsequent image captured by the video camera 130 while the UAV is hovering at the same location.

For the multiple laser range meter embodiments, since the information associated with the distances to the target object 102 from the respective laser range meters has been measured, and since the field-of-view of the video camera 130 is known, it is possible to determine the scale factor without the need for the image processing step. The part that can be used from the image processing step is nPx, but that can be computed as a function of FoV, average distance D/n, $L_1$, and maxPx (where n is the number of laser range meters) using the following equation:

$$nPx = \frac{L_1 * maxPx * n}{\sum_{i=0}^{n} D_i * \tan(FoV/2)}$$

(Note: The foregoing computation also needs an image distortion correction step, or more accurately the inverse of it.)

In response to commands from the control station 150 (see FIG. 3), the video camera 130 and the laser range meters 138a and 138b can be activated by control signals (e.g., via electrical cables) transmitted by the computer system 162. The computer system 162 also controls the flight of the UAV 20 by sending commands to the motor controllers 168 which respectively control the rotation of respective motors 148 that drive rotation of rotors 124a-124d (see FIG. 2).

In accordance with alternative embodiments, the UAV 20 comprises more than one laser range meter that enables measurement of distance to the target object, as well as one or more orientation angle. If two laser range meters are used (as in the embodiment shown in FIG. 12), one orientation angle can be measured (e.g., yaw). If three non-collinearly mounted laser range meters are used (not shown in the drawings), more than one orientation angle can be measured (e.g., yaw and pitch). From this information, a scale factor can be displayed to the user, or a motion constraint can be applied for vehicle control.

Figure 13:
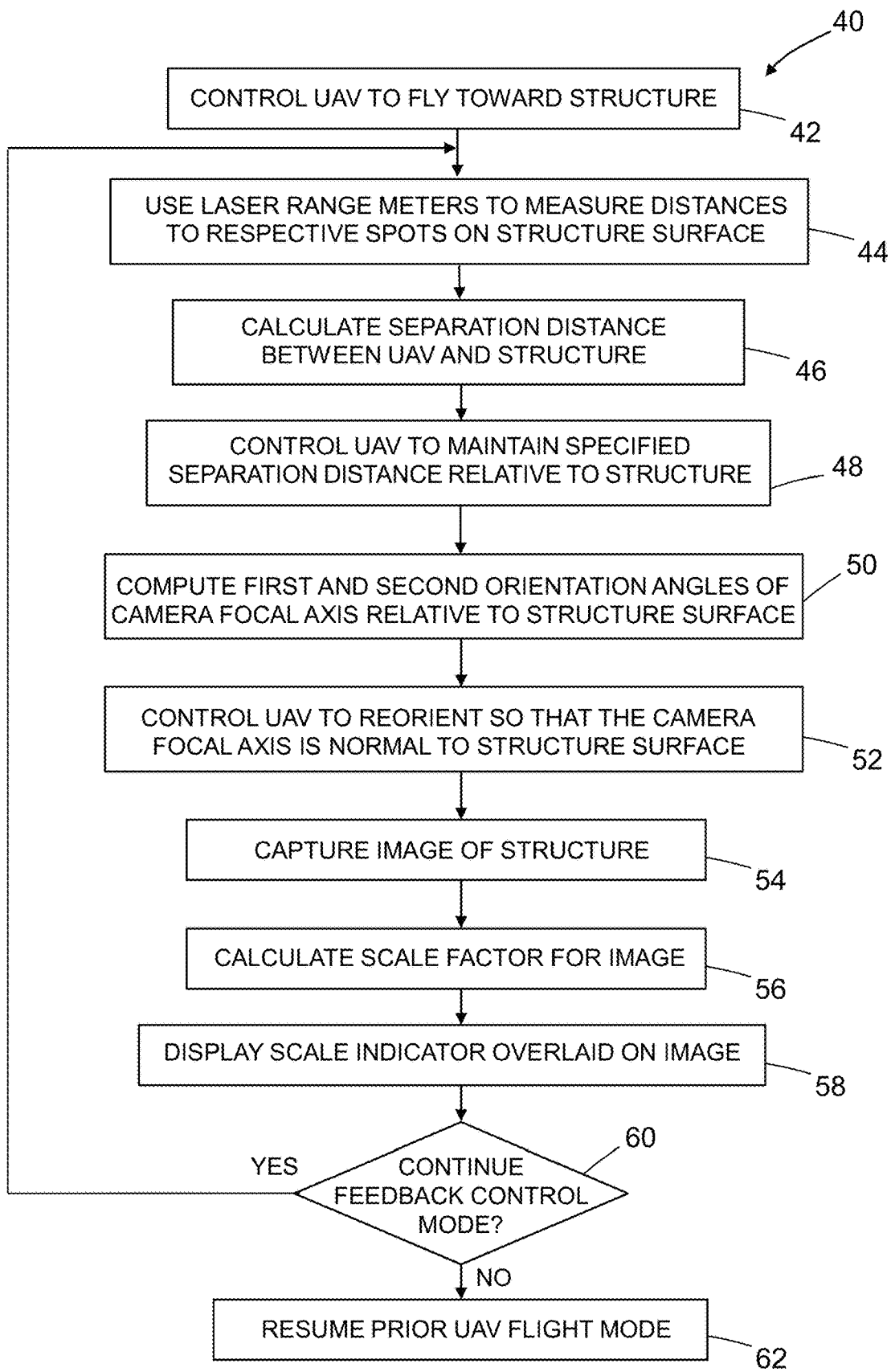
FIG. 13 is a flowchart identifying steps of a method for operating an unmanned aerial vehicle during non-destructive inspection of a target object in accordance with one embodiment.

FIG. 13 is a flowchart identifying steps of a method 40 for operating an unmanned aerial vehicle during non-destructive inspection of a structure in accordance with one embodiment in which three non-collinearly mounted laser range meters are used and yaw and pitch orientation angles are measured. Method 40 comprises the following steps: (a) controlling an unmanned aerial vehicle to fly toward a structure to be inspected (step 42); (b) using the three laser range meters on-board the unmanned aerial vehicle to repeatedly measure (i.e., calculate) respective distances separating the laser range meters from respective spots on a surface of the structure while the unmanned aerial vehicle is flying (step 44); (c) calculating a first separation distance separating the unmanned aerial vehicle from the structure based at least on the distances calculated in step 44 (step 46); (d) controlling the UAV to maintain a specified separation distance (e.g., equal to a goal offset) relative to the structure (step 48); (e) computing yaw and pitch orientation angles of a focal axis of the camera relative to a plane intersecting the three laser spots on the surface of the structure based on the distances calculated in step 44 (step 50); (f) controlling the unmanned aerial vehicle to reorient so that the focal axis of the camera is normal to the surface of the structure (step 52); (g) using the camera on-board the unmanned aerial vehicle to capture an image of the structure while the unmanned aerial vehicle is hovering at the specified separation distance (e.g., at a first location) (step 54); (h) calculating a scale factor for the image when displayed on the display screen based at least in part on the separation distance and a field of view of the camera (step 56); (i) displaying the image with a scale indicator overlaid thereon, a value or a length of the scale indicator representing the scale factor (step 58); and (j) determining with to continue the feedback control mode or not (step 60). If a determination is made in step 60 that the feedback control mode should be continued, the process returns to step 44. If a determination is made in step 60 that the feedback control mode should not continue, the prior UAV flight mode is resumed (step 62).

In accordance with the configuration depicted in FIG. 3, the data acquired by the equipment (i.e., the measurement data acquired by laser range meters 138a and 138b and the image data acquired by video camera 130) on-board UAV 20 is transmitted by a transceiver 160. That message is received by a control station 150 on the ground. The computer system at the control station 150 extracts the image data representing the image from the message and causes it to be displayed on the screen of display monitor 152 by controlling the states of the pixels of the display screen in accordance with the image data.

In accordance with one aspect of the motion control function, the UAV 20 can be controlled to translate to a second location while maintaining the separation distance. Then the video camera 130 is activated to capture a second image of the structure while the unmanned aerial vehicle is hovering at the second location, which second image can be displayed on the display screen. In some instances, the first and second images may respectively comprise first and second sets of image data representing partially overlapping or contiguous areas on a surface of the structure.

In accordance with another aspect of the motion control function, the computer system 162 may include a motion controller programmed to detect a deviation of the separation distance from the goal offset after the unmanned aerial vehicle has moved from the first location to a second location, and then control the unmanned aerial vehicle to fly to a third location at which the separation distance equals the goal offset, thereby reducing the deviation to zero. The motion controller may be further programmed to execute the following operations: computing an orientation angle of the focal axis of the camera relative to the surface of the structure based on the first, second and third distances; detecting a deviation from the desired orientation angle while the unmanned aerial vehicle is hovering at the first location; and controlling the unmanned aerial vehicle to change its orientation so that the orientation angle equals the desired orientation angle.

Figure 14:
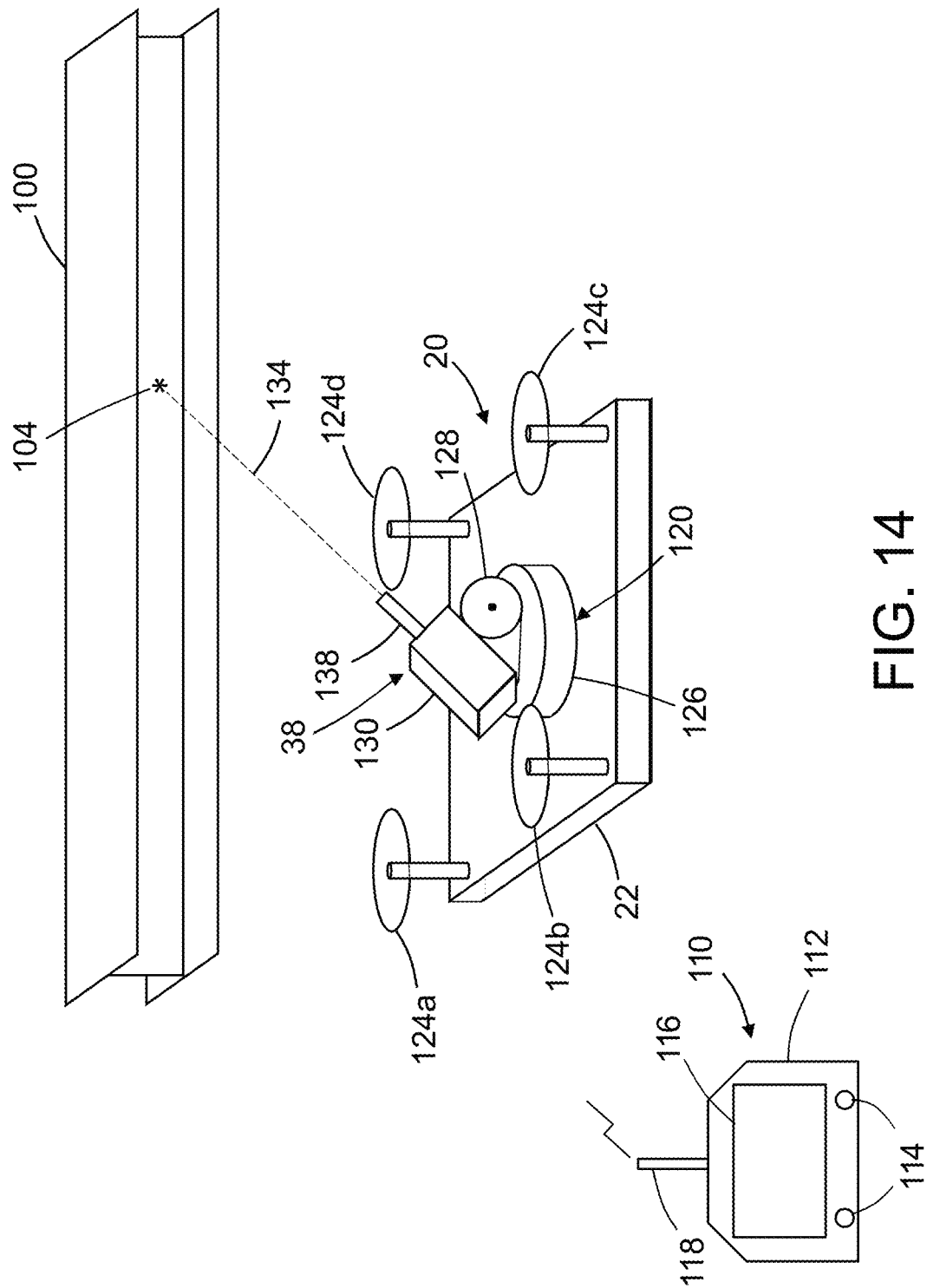
FIG. 14 is a diagram showing a remote-controlled airborne UAV having an on-board local positioning system that includes a camera and a laser range meter aimed at a structural beam.

FIG. 14 shows a system for inspecting structures in accordance with an alternative embodiment. The depicted system includes a remote-controlled airborne UAV 20 that may be moved around a structure requiring periodic inspection. In this example, the UAV 20 is a rotorcraft and the structure to be inspected is a structural I-beam 100. While the target structure is illustrated as a structural I-beam 100, the system is equally well adapted for use in inspecting a wide range of other structures, including, but not limited to, power lines, power generating facilities, power grids, dams, levees, stadiums, large buildings, large antennas and telescopes, tanks, containers, water treatment facilities, oil refineries, chemical processing plants, high-rise buildings, and infrastructure associated with electric trains and monorail support structures. The system is also particularly well suited for use inside large buildings such as manufacturing facilities and warehouses.

In some examples, the UAV 20 can include an on-board system that is able to navigate the UAV 20 in accordance with a preprogrammed flight plan and to enable inspection data for the structural I-beam 100 to be acquired. In some examples, the UAV 20 can be flown along a flight path by an operator using a wireless UAV and payload controller 110 comprising a housing 112, control user interface components 114, a video display 116 and an antenna 118. The inspection data acquired comprises image data captured by the video camera 130 and sensor data from one or more other sensors carried on-board the UAV 20. The preprogrammed flight plan carried by UAV 20 enables the UAV 20 to follow a flight path to a location in proximity to the structural I-beam 100. In some examples, more than one UAV 20 can be used to form a "swarm" of vehicles that can enable an inspection of various areas of a structure in less time than a single UAV.

The UAV 20 depicted in FIG. 14 comprises a frame 22 and four rotors 124a-124d rotatably mounted to the frame 22. Rotation of each rotor is driven by a respective motor (not shown in FIG. 14) mounted to the frame 22. The UAV 20 further comprises an on-board local positioning system 38 mounted to the frame 22. The local positioning system 38 comprises a pan-tilt mechanism 120, a video camera 130 mounted to the pan-tilt mechanism 120, and a laser range meter 138 affixed to the camera 130 in a manner such that the focal axis of the video camera 130 and the aim direction of the laser range meter 138 are mutually parallel. In the example depicted in FIG. 14, the aim direction vector 134 of the laser range meter 138 is indicated by a dashed line, which dashed line also represents a laser beam transmitted by the laser range meter 138 and impinging on a surface of the structural I-beam 100 to form a laser spot 104.

The video camera 130 may have automated (remotely controlled) zoom capabilities. The video camera 130 is supported on the pan-tilt mechanism 120. The pan-tilt mechanism 120 comprises a pan unit 126 and a tilt unit 128.

Figure 15:
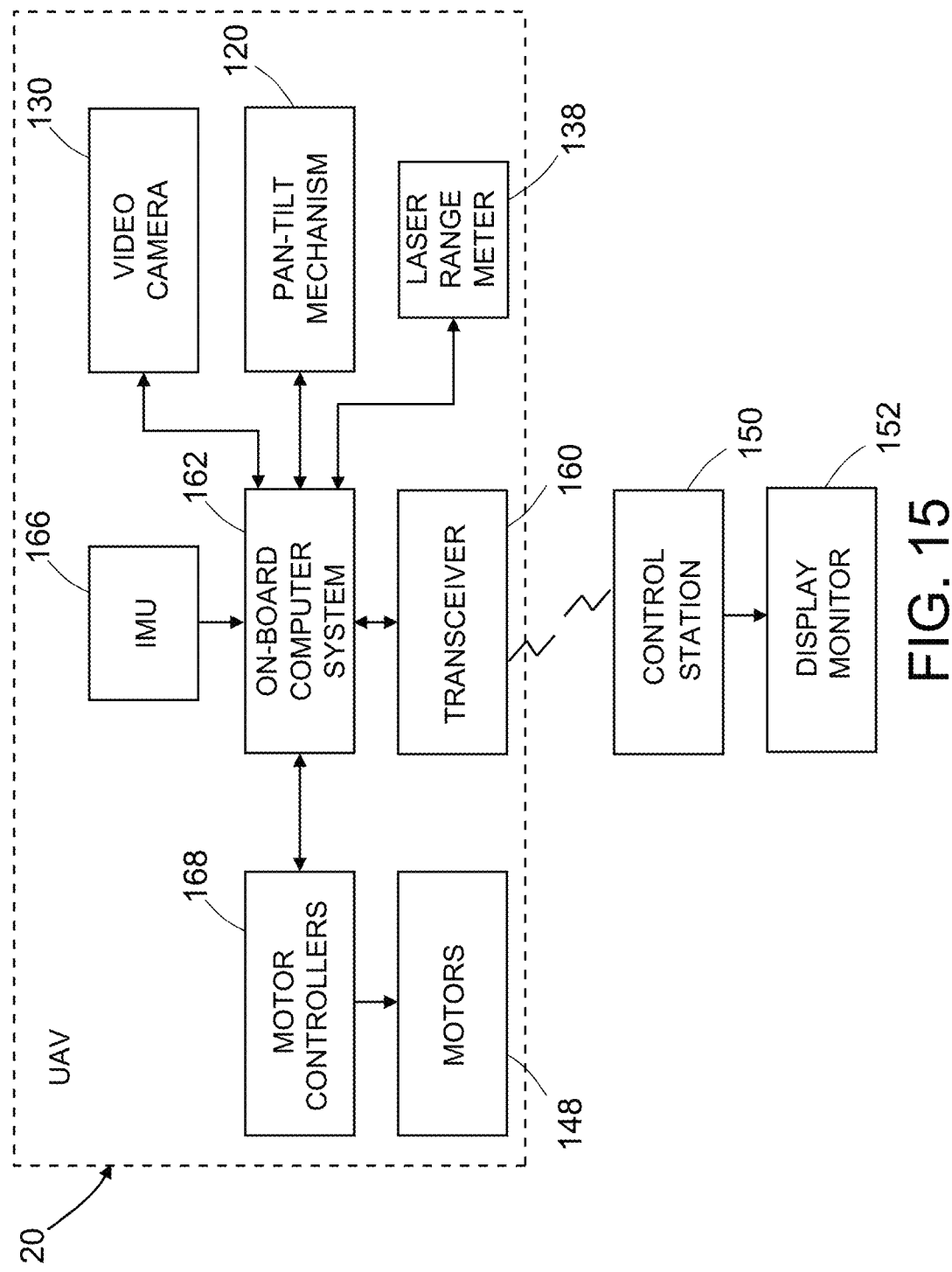
FIG. 15 is a block diagram identifying some components of a system for performing non-destructive inspection of a structure using a remote-controlled UAV having an on-board local positioning system.

The pan unit 126, tilt unit 128, video camera 130 and laser range meter 138 may be operated by an on-board computer system (not shown in FIG. 14, but see computer system 162 in FIG. 15). The computer system 162 in turn may be configured to receive commands from the wireless UAV and payload controller 110, which may be operated by a technician on the ground.

FIG. 15 is a block diagram identifying some components of a system for performing non-destructive inspection of a structure using a remote-controlled UAV 20 in accordance with an alternative embodiment. In this example, the UAV 20 and the equipment carried by the UAV 20 are controlled by the computer system 162 as a function of radiofrequency commands transmitted by a control station 150. Those radiofrequency commands are received by a transceiver 160 on-board the UAV 20, converted into the proper digital format and then forwarded to the computer system 162. The control station 150 may comprise a general-purpose computer system configured with programming for controlling operation of the UAV 20 and the equipment on-board the UAV 20. For example, the pan and tilt angles of the pan-tilt mechanism 120, and therefore the orientation of the video camera 130, can be controlled using the keyboard, mouse, touchpad, or touchscreen of the computer system at the control station 150 or other user interface hardware (e.g., a gamepad). In addition, the computer system at the control station 150 is configured with programming for processing data received from the UAV 20 during an inspection operation. In particular, the computer system of the control station 150 may comprise a display processor configured with software for controlling a display monitor 152 to display images acquired by the video camera 130. The optical image field, as sighted by the video camera 130, can be displayed on the display monitor 152.

As previously described, the equipment on-board the UAV 20 comprises a pan-tilt mechanism 120, a video camera 130 and a laser range meter 138, all of which can be activated by control signals (e.g., via electrical cables) transmitted by the computer system 162. The computer system 162 also controls the flight of the UAV 20 by sending commands to the motor controllers 168 which respectively control the rotation of respective motors 148 that drive rotation of rotors 124a-124d (see FIG. 14).

In accordance with one embodiment, the pan-tilt mechanism 120 comprises a pan unit 126 (see FIG. 14) configured to rotate the camera 130 (and laser range meter 138 mounted thereto) about a pan axis 124 and a tilt unit 128 (see FIG. 14) configured to rotate the camera 130 (and laser range meter 138 mounted thereto) about a tilt axis, which is orthogonal to the pan axis, in response to control signals received from the computer system 162 (see FIG. 15). Actuators (not shown in the drawings), such as servo-motors or the like, in the pan-tilt mechanism 120 may receive and respond to control signals from the computer system 162 by adjusting the angular rotation of the camera 130 about the pan and tilt axes, as well as the angular speed at which the camera 130/laser range meter 138 rotate about the pan and tilt axes. The pan-tilt mechanism 120 further comprises pan and tilt rotational encoders (not shown in the drawings) that send signals representing current angular position data back to the computer system 162. The control signals applied to the pan-tilt mechanism 120 may be computed by the computer system 162 108 in response to user instructions (e.g., manipulation of an input device that is part of the control station 150) or an automatic path generator.

The pan-tilt mechanism 120 is controlled to rotationally adjust the laser range meter 138 and the video camera 130 to selected angles around the pan and tilt axes. The aim direction vector 134, which describes the orientation of the laser range meter 138 (and the focal axis of the video camera 130) relative to the fixed coordinate system of the frame 22 of UAV 20, is determined from the pan and tilt angles when the laser range meter 138 is aimed at a point of interest on the structural I-beam 100.

The laser range meter 138 may be incorporated inside the housing of video camera 130 or mounted to the outside of video camera 130 in such a way that it transmits a laser beam along the aim direction vector 134. The laser range meter 138 is configured to measure the distance to any visible feature on or any marker attached to the structural I-beam 100. In accordance with some embodiments, the laser range meter 138 uses a laser beam to determine the distance to the structural I-beam 100. The most common form of laser range meter operates on the time-of-flight principle by sending a laser pulse in a narrow beam towards the structural I-beam 100 and measuring the time taken by the pulse to be reflected off the structural I-beam 100 and returned to a photodetector incorporated inside the laser range meter 138. With the speed of light known and an accurate measurement of the time made, the distance from the laser range meter 138 to the laser spot 104 can be calculated. Many pulses are fired sequentially while the UAV 20 is hovering at a location and the average response is most commonly used.

Referring again to FIG. 15, the equipment on-board the UAV 20 further comprises an inertial measurement unit 166 (hereafter "IMU 166"). An inertial measurement unit works by detecting linear acceleration using one or more accelerometers and rotational rate using one or more gyroscopes. In a typical configuration, an inertial measurement unit comprises one accelerometer and one gyroscope per axis for each of the three vehicle axes: pitch, roll and yaw. The computer system 162 may further comprise a separate processor configured with inertial navigation software that utilizes the raw IMU measurements to calculate attitude, angular rates, linear velocity and position relative to a global reference frame. The data collected from the IMU 166 enables the computer system 162 to track the UAV's position using a method known as dead reckoning.

Figure 16:
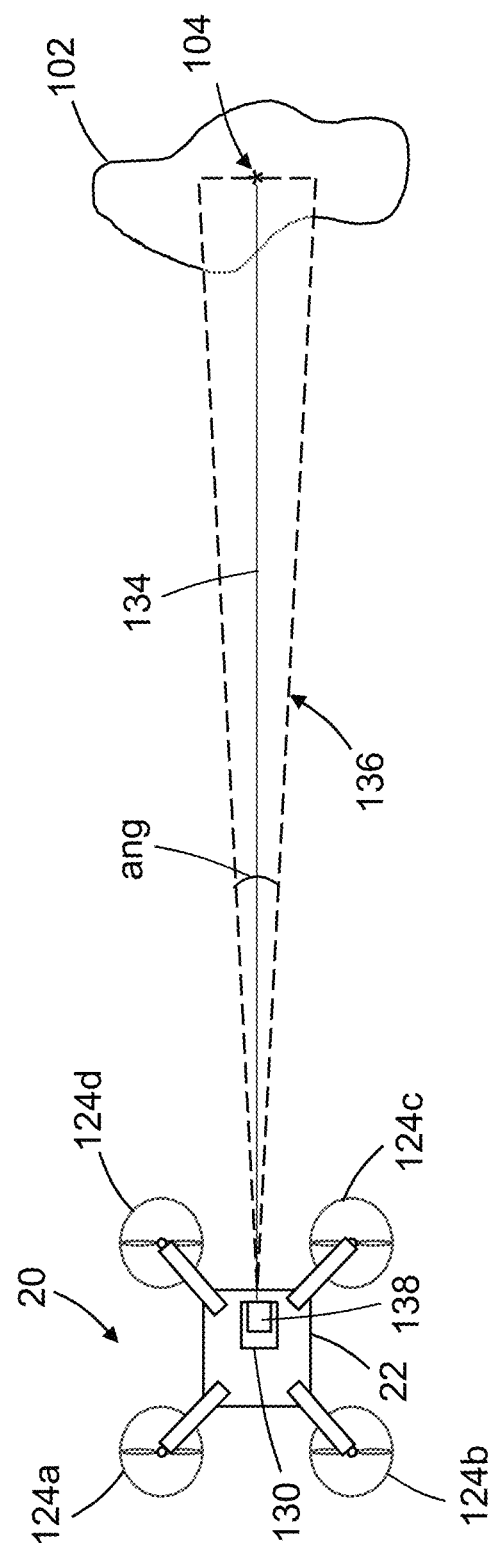
FIG. 16 is a diagram showing a top view of an airborne UAV having a local positioning system comprising a video camera and a gimbaled laser range meter directed at a target object. An inertial measurement unit on-board the UAV is not shown.

FIG. 16 is a diagram showing a top view of an airborne UAV 20 having a local positioning system 38 comprising a video camera 130 and a laser range meter 138 directed at a target object 102. The laser beam transmitted by the laser range meter 138 impinges on a surface of the target 102 at a laser spot 104. The angle of the field-of-view 136 (indicated by a pair of dashed lines) of the video camera 130 is indicated by the arc labeled "ang" in FIG. 16. The aim direction vector 134 extends from the laser range meter 138 to the laser spot 104 and has a length D (also referred to below as the "distance D" separating the laser range meter 138 and the target object 102).

In accordance with one embodiment, the distance D is measured by the laser range meter 138 while the angle of the field-of-view 136 is known. This information can be used to overlay or superimpose a size scale indicator on the screen of display monitor 152 (see FIG. 15) when an image captured by the video camera 130 is being displayed. If the distance D to the target object 102 is known, scale information displayed in the image on the screen of display monitor 152 allows a user to gage the size of objects in the displayed image. The scale indicator could be in the form of the overall horizontal and vertical dimensions of the image on the display or an on-screen overlay showing scale factor data on a portion of the screen. This provides the size context for the scene captured by the video camera 130 and displayed in the image on the screen of display monitor 152.

The known camera field-of-view angle is given by the following equation:

$$ang = 2*a\tan(SCRx/(2D))$$

The image X and Y values are given by the following equations:

$$SCRx = D*\tan(ang/2)$$

$$SCRy = ratio*SCRx$$

where D is the distance to the target object surface measured by the laser range meter 138, and "ratio" is the image aspect ratio (known), i.e., the ratio of the image width w to image height h.

In accordance with further embodiments, the fully motorized pan-tilt mechanism 120 can be used for aiming the laser range meter 138 independently of the UAV flight controls to acquire a direct measurement of the distance separating two points on the surface of the target object 102. Assuming that the translational offset is zero or can be measured, then all of the basic features of the local positioning system 38 can be used.

In accordance with alternative embodiments, it may be possible using only a single powered and measured axis gimbal (tilt or pitch axis). For a UAV, the overall yaw (pan) associated with the vehicle can also be used to point the laser range meter 138 without changing vehicle position, but changing the pitch of the UAV 20 will cause the UAV 20 to translate. To address this, a separate motorized pitch controller for the laser range meter 138 can be used.

Figure 17:
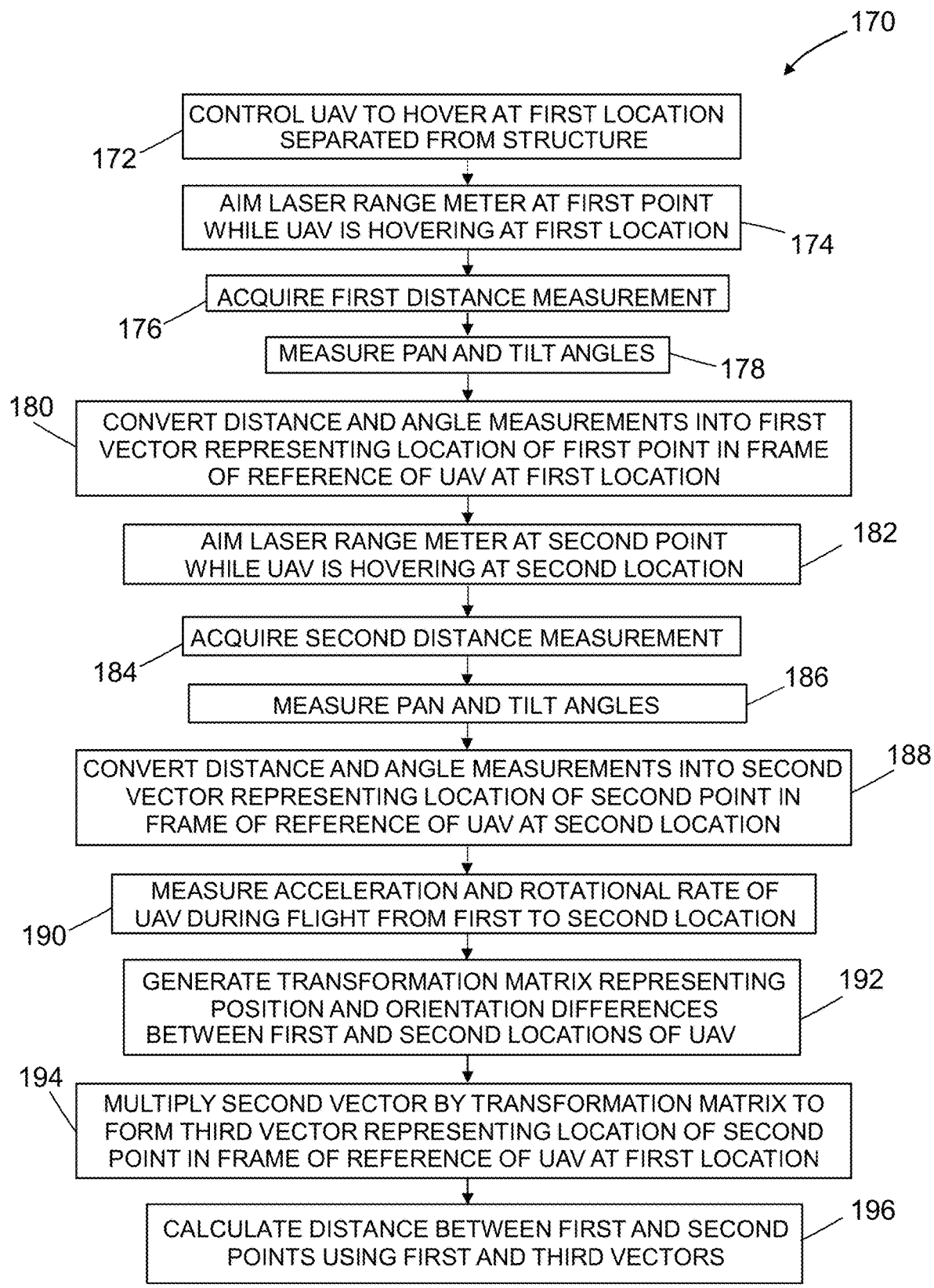
FIG. 17 is a flowchart identifying steps of a method for sizing a feature of a structure using a UAV carrying a local positioning system.

FIG. 17 is a flowchart identifying steps of a method 170 for sizing (i.e., measuring a point-to-point distance of) a feature on the surface of a structure to be inspected using a UAV 20 carrying a local positioning system 38. The method 170 comprises the following steps: (a) controlling the UAV 20 to fly toward and then hover at a first location which is separated from a structure to be inspected (step 172); (b) aiming the laser range meter 138 at a first point corresponding to a first visible feature on a surface of the structure while the UAV is hovering at the first location (step 174) and acquiring a first distance measurement (step 176); (c) using the pan-tilt mechanism 120 to measure the respective pan and tilt angles of the laser range meter 138 when the latter is aimed at the first point (step 178); (d) converting the distance and angle measurements acquired in steps 176 and 178 into a first vector representing the location of the first point in the frame of reference of the UAV 20 at the first location (step 180); (e) aiming the laser range meter 138 at a second point corresponding to a second visible feature on the surface of the structure while the UAV 20 is hovering at a second location (step 182) and acquiring a second distance measurement (step 184); (f) using the pan-tilt mechanism 120 to measure the respective pan and tilt angles of the laser range meter 138 when the latter is aimed at the second point (step 186); (g) converting the distance and angle measurements acquired in steps 184 and 186 into a second vector representing the location of the second point in the frame of reference of the UAV 20 at the second location (step 188); (h) using an IMU 186 to measure acceleration and rotational rate of the UAV during flight from the first location to the second location (step 190); (i) generating a transformation matrix representing a position difference and an orientation difference between the first and second locations of the UAV 20 based on information acquired in step 190 (step 192); (j) multiplying the second vector by the transformation matrix to form a third vector representing the location of the second point in the frame of reference of the UAV 20 at the first location (step 194); and (k) calculating a distance between the first and second points using the first and third vectors (step 196).

In accordance with one embodiment, the method described in the preceding paragraph further comprises: (l) transmitting one or more messages containing measurement data acquired in steps 176, 178, 184, 186 and 190 from the UAV 20; (m) receiving the one or more messages at a computer system at a ground station (e.g., control station 150 (see FIG. 15)); and (n) extracting the measurement data from the message, wherein steps 180, 188, 192, 194 and 196 are performed by the computer system at the ground workstation. This method may further comprise: using the video camera 130 to capture an image of a portion of the surface of the structure that includes the first and second visible features while the UAV is hovering at the first location; and displaying the image and symbology representing a value of the distance calculated in step 196 overlaid on the image on a display screen of the computer system at the ground workstation. For example, the first and second visible features may be respective endpoints of an anomaly (such as a crack) in the structure.

Figure 18:
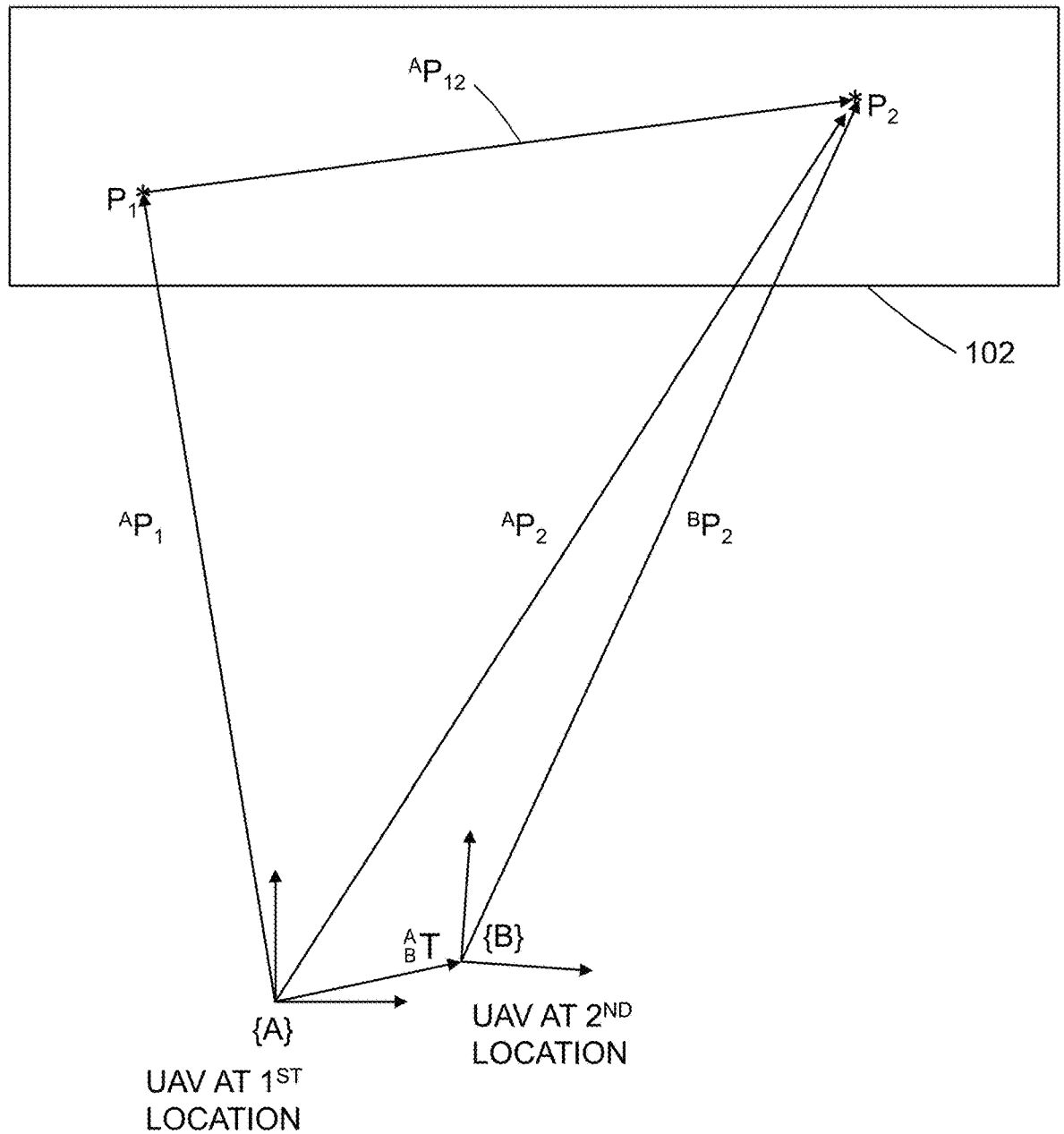
FIG. 18 is a vector diagram illustrating a method for generating a vector representing the distance and direction from a first point on a target object to a second point on the target object using the UAV partially depicted in FIG. 16.

FIG. 18 is a vector diagram illustrating the above-described method for generating a vector representing the distance and direction from a first point on a target object to a second point on the target object using the above-described UAV 20. Because a single laser range meter is used to directly measure coordinates for two points, a common reference location is used to determine the distance between the two points. In this situation, the user determines the difference between the first location of the UAV 20 during acquisition of the coordinates of the first point in a first frame of reference of the local positioning system 38 (and of the UAV 20) and the second location of the UAV 20 during acquisition of the coordinates of the second point in a second frame of reference of the local positioning system which is offset from the first frame of reference. Using the acquired coordinate position data, a transformation matrix representing a position difference and an orientation difference between the first and second frames of reference of the local positioning system 38 (i.e., the differences between the first and second locations of the UAV 20 at the instants in time when the first and second measurements were made) is generated.

The vector diagram seen in FIG. 18 shows the configuration described in the preceding paragraph. Two pairs of mutually orthogonal arrows that meet at respective vertices graphically depict respective frames of reference (a respective third mutually orthogonal axis for each frame of reference is not shown to avoid clutter in the drawing). The left-hand pair of arrows represents a frame of reference A of the UAV 20 at the first location, while the right-hand pair of arrows represents a frame of reference B of the UAV 20 at the second location. The location offset of frame of reference B relative to frame of reference A is represented in FIG. 18 by the transformation matrix $_B^A\text{T}$, which is a 4×4 homogeneous transformation matrix that describes reference frame {B} relative to reference frame {A}. In this situation the position and orientation of reference frame {B} relative to reference frame {A} may be determined from data acquired by the IMU 166.

The distance from the laser range meter 138 (not shown in FIG. 18) to a first point P1 on a surface of a target object 102 when the UAV 20 is at the first location is represented by the length of a vector $^A P_1$ extending from the origin of frame of reference {A}. The distance from the laser range meter 138 to a second point P2 on the surface of target object 102 when the UAV 20 is at the second location is represented by the length of a vector $^B P_2$ extending from the origin of frame of reference {B} to second point P2. The vector $^B P_2$ is then multiplied by the transformation matrix $_B^A\text{T}$ to convert it into a vector defined in reference frame A. The resulting product is:

$$^B P_2 = {}^A P_2$$

The magnitude (i.e., length) of vector $^A P_2$ represents the distance from the laser range meter 138 to the second point P2 when the UAV 20 was at the first location. The distance d is determined from the difference between those two vectors, which operation can be expressed as follows:

$$d = |{}^A P_2 - {}^A P_1|$$

In an equivalent manner, the distance d between points $P_1$ and $P_2$ is the magnitude (i.e., the Euclidean norm) of the 3-D vector connecting the two points. It is computed as the square root of the sum of the squares of the differences of the individual components of the measured point coordinates (i.e., x, y and z values). The general form of this equation is:

$$d = \sqrt{(x_2 - x_1)^2 + (y_2 - y_1)^2 + (z_2 - z_1)^2}$$

The resulting distance value is displayed (e.g., superimposed or virtually overlaid) on the screen of the display monitor 152 along with the camera image of the portion of the surface of the target object 102 that includes points P1 and P2. Optionally, a line can be drawn between the two points to show context.

The flight of the UAV 20 during a non-destructive inspection operation may be subjected to various motion constraints which are designed to make the UAV 20 easier for a user to control for specific types of tasks. The term "motion constraints" should be given the ordinary kinematic definition. In general, motion constraints remove one or more degrees of freedom (DoF) from the motion of an object. For example, a single rigid body object in free space has six degrees of freedom (i.e., x, y, z, roll, pitch and yaw), but when that rigid body object is constrained, for example, by placing it on a table (in a location with gravity), the number of degrees of freedom is reduced to three (i.e., x, y and yaw). In this example, the planar surface of the table introduces motion constraints that remove three degrees of freedom from the system. In another example, if a rotational (revolute) joint is attached between a 6-DoF object and another fixed-location object, the rotational joint constrains the motion of the object to one degree of freedom (i.e., rotation about the axis of the revolute joint), by removing five degrees of freedom from the system. These examples are physical motion constraints, but motion constraints can also be applied in software to remove one or more degrees of freedom from controlled motion—which is what is proposed in this disclosure.

For the system involving a UAV and its operator, which in standard operation can control six degrees of freedom in free space, the distance measurement information is used to constrain the motion of the UAV so that one or more of the degrees of freedom of the UAV is not directly available to the operator to control. For example, if a motion constraint is applied to the distance to the target object (using real-time measurement data from the laser range meter), the system will attempt to keep the UAV at that specified distance. This does not mean that the low-level controller cannot still control six degrees of freedom. Instead, it means that from the operator's point of view, there is one (or more) axis that they are not controlling directly. If a wind gust attempts to push the UAV in the direction of the motion constraint, the low-level controller will provide the motion control to compensate for this without requiring user input. This is useful in conditions where it is desirable to maintain a specific offset from a target object. It is also useful in providing virtual boundaries or for collision avoidance.

Once the measurement data has been acquired, it can be displayed to the user or used for additional capabilities, such as providing motion constraints that can be used for vehicle control. This extension enables motion control capabilities for the UAV 20 based on feedback of the data from the sensors and derived measurement data. This results in the ability to provide for semi-automated control to the system, as well as more intuitive manual control.

For the embodiments that employ laser pointers, the only types of motion constraints that can be added to the control system are those associated with position, since these embodiments do not measure orientation. The embodiments that have two or more laser range meters have the ability to measure orientation of the UAV 20 relative to the target object 102, in addition to determining the distance. This allows the embodiments with more than one laser range meter to control both position and orientation of the UAV 20 relative to the target object 102.

Figure 19:
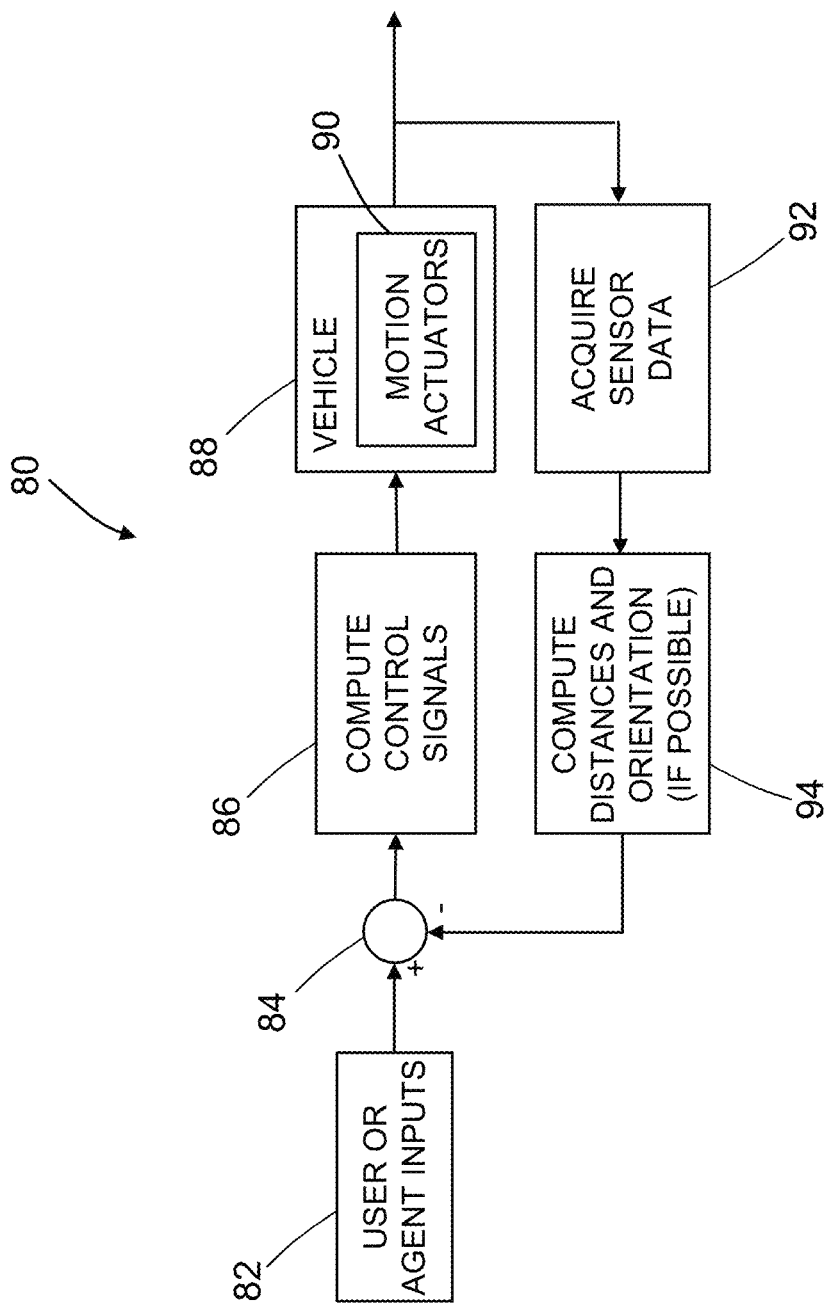
FIG. 19 is a block diagram identifying steps of a feedback control process for controlling the motion of a UAV based on measurement data acquired by equipment on-board the UAV.

FIG. 19 is a block diagram identifying steps of a feedback control process 80 for controlling the motion of a vehicle 88 based on measurement data acquired by the equipment on-board the vehicle 88 in accordance with one embodiment. First, the user or agent inputs commands regarding the target distance and orientation of the vehicle 88 (step 82), which inputs are received by a summing junction 84. The summing junction 84 also receives distance and orientation data from a distance and orientation computation software module which is configured to compute distance and orientation (step 94). The summing junction 84 subtracts the computed distance from the commanded distance and subtracts the computed orientation from the commanded orientation. The resulting deviations are output to a control signal computation software module that is configured to compute control signals calculated to reduce the deviations (step 86). Based on the output from the summing junction 84, the control signal computation software module outputs control signals to the motion actuators 90 (e.g., rotor motor controllers) on-board the vehicle 80. During flight of the vehicle 80, the sensors acquire sensor data (step 92), which sensor data is used to compute the distance and orientation (step 94).

In accordance with some embodiments, the computer system 162 uses an on-board alignment methodology to determine relative location (position and orientation) offsets of the video camera 130 relative to the target object 102. This process uses distance information from three laser range meters to compute relative location in real-time. The computer system 162 then uses that data to produce the desired feedback-based motion of the UAV 20.

One form of control that this process enables is semi-automated control to assist an operator in some aspect of alignment, such as orientation of the video camera 130 to make sure that its focal axis is always perpendicular to the surface of the target object or making sure that it is always a specific distance from the surface.

More specifically, the computer system 162 is configured (e.g., programmed) to determine what movements are needed to align the focal axis of the video camera 130 with a vector normal to the surface of the target object based on the distance information received from the laser range meters. The computer system 162 sends command signals to selected motor controllers 168 to activate the motors 148 as needed to orient the UAV 20 so that the focal axis of video camera 130 is aligned with the surface normal.

In addition to using the three laser range meters to determine distance to the target object, they are also used to determine the yaw and pitch orientation angles (hereinafter "yaw angle" and "pitch angle"). For the purpose of illustration, assume that the three laser range meters are disposed at the vertices of an isosceles triangle such that the distance separating the two laser range meters disposed at the vertices of the base of the isosceles triangle is a and the distance separating the third laser range meter and a midpoint of the base of the isosceles triangle (i.e., the height of the isosceles triangle) is b. Assume that $d_1$, $d_2$, and $d_3$ are the respective measured distances of the respective laser range meters to the surface of the target object. Equations (2) and (3) can be used to calculate the pitch and yaw angles:

$$\text{PitchAngle}=a\tan 2(d_1-(d_2+d_3)/2,b) \qquad (2)$$

$$\text{YawAngle}=a\tan 2(d_2-d_3,a) \qquad (3)$$

where PitchAngle and YawAngle are the current computed orientation angles relative to the surface of the target object, and a tan 2 is the two argument arc tangent inverse trigonometric function. The goal for these angles, which are measured relative to the surface normal at the current location, is to be equal to zero; and the process to achieve the goal angles is described below.

With the current yaw and pitch angles calculated, the system motion controller can use a velocity control method for the controlled motions: pan, tilt, and distance. A feedback controller, such as a proportional-integral-derivative (PID) controller, can be used to drive to zero the error between the current angle and the desired angle. Equations (4) and (5) can be used to compute the pitch and yaw motion control:

$$\text{PitchRate}=Kp_{pitch}*(\text{PitchAngle}-\text{PitchAngle}_{goal}) \qquad (4)$$

$$\text{YawRate}=Kp_{yaw}*(\text{YawAngle}-\text{YawAngle}_{goal}) \qquad (5)$$

where PitchRate and YawRate describe the angular rotation rates about the pitch axis of the alignment apparatus and yaw axis of the base, respectively; $Kp_{pitch}$ and $Kp_{yaw}$ are the proportional feedback gains associated with the pitch and yaw axes, respectively; PitchAngle and YawAngle are the angles computed from Eqs. (2) and (3), respectively; and $\text{PitchAngle}_{goal}$ and $\text{YawAngle}_{goal}$ are the desired goal angles to which the controller is driving the system toward (as mentioned earlier, these are both zero for this example). Integral and derivative feedback may also be used, but are not shown here.

While methods for controlling the operation of an unmanned aerial vehicle during non-destructive inspection of a structure have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

As used in the claims, the term "location" comprises position in a three-dimensional coordinate system and orientation relative to that coordinate system.

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method for operating an unmanned aerial vehicle, comprising:
   (a) controlling the unmanned aerial vehicle to fly toward a structure;
   (b) using first and second laser range meters on-board the unmanned aerial vehicle to repeatedly measure first and second distances respectively separating the first and second laser range meters from respective first and second spots projected on a surface of the structure by the first and second laser range meters while the unmanned aerial vehicle is flying, wherein respective axes of the first and second laser range meters are mutually parallel and separated by a distance d;
   (c) calculating a separation distance separating the unmanned aerial vehicle from the structure based at least on the first and second distances;
   (d) determining whether the separation distance equals a goal offset;
   (e) controlling the unmanned aerial vehicle to hover at a first location separated from the structure by the separation distance in response to a determination in step (d) that the separation distance is equal to the goal offset;
   (f) using a camera on-board the unmanned aerial vehicle to capture a first image of the surface with first and second laser spots while the unmanned aerial vehicle is hovering at the first location;
   (g) calculating a scale factor based on a number of pixels separating two centroids corresponding to the first and second laser spots in the first image and the distance d;
   (h) ceasing to project the first and second laser spots on the surface of the structure;
   (i) using the camera to capture a second image of the surface of the structure while the unmanned aerial vehicle is hovering at the first location and the first and second laser spots are absent from the surface;
   (j) displaying the second image on a display screen;
   (k) displaying a scale indicator overlaid on the second image displayed on the display screen, a value or a length of the scale indicator representing the scale factor.

2. The method as recited in claim 1, wherein the first and second distances are equal to the goal offset.

3. The method as recited in claim 1, wherein the display screen is not on-board the unmanned aerial vehicle, further comprising:
   transmitting a message containing image data representing the first image from the unmanned aerial vehicle;
   receiving the message at a ground station; and
   extracting the image data representing the first image from the message,
   wherein displaying the first image on the display screen comprises controlling states of pixels of the display screen in accordance with the image data.

4. The method as recited in claim 1, further comprising:
   controlling the unmanned aerial vehicle to translate to a second location while maintaining the separation distance;
   using the camera to capture a third image of the surface of the structure while the unmanned aerial vehicle is hovering at the second location; and
   displaying the third image on the display screen.

5. The method as recited in claim 4, wherein the second and third images respectively comprise first and second sets of image data representing partially overlapping or contiguous areas on the surface of the structure.

6. A method for operating an unmanned aerial vehicle, comprising:
   (a) controlling the unmanned aerial vehicle to fly toward a structure;
   (b) using first and second laser range meters on-board the unmanned aerial vehicle to repeatedly measure first and second distances respectively separating the first and second laser range meters from respective first and second spots on a surface of the structure while the unmanned aerial vehicle is flying;
   (c) calculating a separation distance separating the unmanned aerial vehicle from the structure based at least on the first and second distances;
   (d) determining whether the separation distance equals a goal offset;
   (e) controlling the unmanned aerial vehicle to hover at a first location separated from the structure by the separation distance in response to a determination in step (d) that the separation distance is equal to the goal offset;
   (f) using a camera on-board the unmanned aerial vehicle to capture a first image of the structure while the unmanned aerial vehicle is hovering at the first location;
   (g) displaying the first image on a display screen;
   (h) computing an orientation angle of a focal axis of the camera relative to a line connecting the first and second spots on the surface of the structure based on the first and second distances;
   (i) calculating a scale factor for the first image when displayed on the display screen based at least in part on the separation distance and the orientation angle; and
   (j) displaying a scale indicator overlaid on the first image, a value or a length of the scale indicator representing the scale factor.

7. The method as recited in claim 1, further comprising:
   using a third laser range meter on-board the unmanned aerial vehicle to repeatedly measure a third distance separating the third laser range meter from a third spot on the surface of the structure while the unmanned aerial vehicle is flying,
   wherein the separation distance is calculated based on the first, second and third distances.

8. A method for operating an unmanned aerial vehicle, comprising:
   (a) controlling the unmanned aerial vehicle to fly toward a structure;
   (b) using first, second, and third laser range meters on-board the unmanned aerial vehicle to repeatedly measure first, second, and third distances respectively separating the first, second, and third laser range meters from respective first, second, and third spots on a surface of the structure while the unmanned aerial vehicle is flying;

(c) calculating a separation distance separating the unmanned aerial vehicle from the structure based on the first, second, and third distances;

(d) determining whether the separation distance equals a goal offset;

(e) controlling the unmanned aerial vehicle to hover at a first location separated from the structure by the separation distance in response to a determination in step (d) that the separation distance is equal to the goal offset;

(f) using a camera on-board the unmanned aerial vehicle to capture a first image of the structure while the unmanned aerial vehicle is hovering at the first location; and (g) displaying the first image on a display screen;

(h) computing first and second orientation angles of the focal axis of the camera relative to a plane defined by the first, second and third spots on the surface of the structure based on the first, second and third distances;

(i) calculating a scale factor for the first image when displayed on the display screen based on the separation distance and the first and second orientation angles; and (j) displaying a scale indicator overlaid on the first image, a value or a length of the scale indicator representing the scale factor.

9. The method as recited in claim 1, further comprising:
controlling the unmanned aerial vehicle to fly to a second location;
detecting a deviation of the separation distance from the goal offset after the unmanned aerial vehicle has moved from the first location to the second location; and
controlling the unmanned aerial vehicle to fly to a third location at which the separation distance equals the goal offset, thereby reducing the deviation to zero,
wherein control of the flight of the unmanned aerial vehicle toward the third location is provided by a motion controller on-board the unmanned aerial vehicle.

10. A method for operating an unmanned aerial vehicle, comprising:
(a) controlling the unmanned aerial vehicle to fly toward a structure;
(b) using first, second, and third laser range meters on-board the unmanned aerial vehicle to repeatedly measure first, second, and third distances respectively separating the first, second, and third laser range meters from respective first, second, and third spots on a surface of the structure while the unmanned aerial vehicle is flying;
(c) calculating a separation distance separating the unmanned aerial vehicle from the structure based on the first, second, and third distances;
(d) determining whether the separation distance equals a goal offset;
(e) controlling the unmanned aerial vehicle to hover at a first location separated from the structure by the first separation distance in response to a determination in step (d) that the separation distance is equal to the goal offset;
(f) using a camera on-board the unmanned aerial vehicle to capture a first image of the structure while the unmanned aerial vehicle is hovering at the first location; and
(g) displaying the first image on a display screen;

(h) computing an orientation angle of a focal axis of the camera relative to the surface of the structure based on the first, second and third distances;

(i) detecting a deviation of the orientation angle from a desired orientation angle while the unmanned aerial vehicle is hovering at the first location; and (j) controlling the unmanned aerial vehicle to change its orientation so that the orientation angle equals the desired orientation angle, wherein control of the orientation of the unmanned aerial vehicle is provided by a motion controller on-board the unmanned aerial vehicle.

11. The method as recited in claim 6, further comprising:
controlling the unmanned aerial vehicle to translate to a second location while maintaining the separation distance;
using the camera to capture a second image of the surface of the structure while the unmanned aerial vehicle is hovering at the second location; and
displaying the second image on the display screen.

12. The method as recited in claim 11, wherein the first and second images respectively comprise first and second sets of image data representing partially overlapping or contiguous areas on the surface of the structure.

13. The method as recited in claim 6, further comprising:
using a third laser range meter on-board the unmanned aerial vehicle to repeatedly measure a third distance separating the third laser range meter from a third spot on a surface of the structure while the unmanned aerial vehicle is flying,
wherein the separation distance is calculated based on the first, second and third distances.

14. The method as recited in claim 6, further comprising:
controlling the unmanned aerial vehicle to fly to a second location;
detecting a deviation of the separation distance from the goal offset after the unmanned aerial vehicle has moved from the first location to the second location; and
controlling the unmanned aerial vehicle to fly to a third location at which the separation distance equals the goal offset, thereby reducing the deviation to zero,
wherein control of the flight of the unmanned aerial vehicle toward the third location is provided by a motion controller on-board the unmanned aerial vehicle.

15. The method as recited in claim 8, further comprising:
controlling the unmanned aerial vehicle to translate to a second location while maintaining the separation distance;
using the camera to capture a second image of the surface of the structure while the unmanned aerial vehicle is hovering at the second location; and
displaying the second image on the display screen.

16. The method as recited in claim 15, wherein the first and second images respectively comprise first and second sets of image data representing partially overlapping or contiguous areas on the surface of the structure.

17. The method as recited in claim 8, further comprising:
controlling the unmanned aerial vehicle to fly to a second location;
detecting a deviation of the separation distance from the goal offset after the unmanned aerial vehicle has moved from the first location to the second location; and
controlling the unmanned aerial vehicle to fly to a third location at which the separation distance equals the goal offset, thereby reducing the deviation to zero, wherein control of the flight of the unmanned aerial vehicle toward the third location is provided by a motion controller on-board the unmanned aerial vehicle.

18. The method as recited in claim 10, further comprising:
controlling the unmanned aerial vehicle to translate to a second location while maintaining the separation distance;
using the camera to capture a second image of the surface of the structure while the unmanned aerial vehicle is hovering at the second location; and
displaying the second image on the display screen.

19. The method as recited in claim 18, wherein the first and second images respectively comprise first and second sets of image data representing partially overlapping or contiguous areas on the surface of the structure.

20. The method as recited in claim 10, further comprising:
controlling the unmanned aerial vehicle to fly to a second location;
detecting a deviation of the separation distance from the goal offset after the unmanned aerial vehicle has moved from the first location to the second location; and
controlling the unmanned aerial vehicle to fly to a third location at which the separation distance equals the goal offset, thereby reducing the deviation to zero,
wherein control of the flight of the unmanned aerial vehicle toward the third location is provided by a motion controller on-board the unmanned aerial vehicle.

* * * * *